(12) United States Patent
Suzuki et al.

(10) Patent No.: US 10,733,821 B2
(45) Date of Patent: Aug. 4, 2020

(54) KEY INFORMATION MANAGEMENT DEVICE AND KEY INFORMATION MANAGEMENT METHOD

(71) Applicant: TOYOTA JIDOSHA KABUSHIKI KAISHA, Toyota-shi (JP)

(72) Inventors: Ryuichi Suzuki, Nagakute (JP); Yuki Ito, Iwakura (JP); Hiroyasu Shiokawa, Nagoya (JP); Yasumasa Kobayashi, Nagoya (JP); Naoki Yamamuro, Nagoya (JP); Makoto Akahane, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/273,218

(22) Filed: Feb. 12, 2019

(65) Prior Publication Data

US 2019/0266820 A1    Aug. 29, 2019

(30) Foreign Application Priority Data

Feb. 26, 2018  (JP) .................. 2018-031589

(51) Int. Cl.
*G07C 9/00* (2020.01)
*B60R 25/24* (2013.01)
*G07C 9/27* (2020.01)

(52) U.S. Cl.
CPC ........ *G07C 9/00309* (2013.01); *B60R 25/241* (2013.01); *G07C 9/00571* (2013.01); *G07C 9/27* (2020.01); *G07C 2009/00547* (2013.01)

(58) Field of Classification Search
CPC ............ G07C 9/00309; G07C 9/00103; G07C 9/00571; B60R 25/241
USPC ......................................... 340/5.72
See application file for complete search history.

(56) References Cited

U.S. PATENT DOCUMENTS

2017/0308075 A1* 10/2017 Whitaker ............. B60W 10/04
2018/0326947 A1* 11/2018 Oesterling ............ B60R 25/241
2019/0120195 A1* 4/2019 King ...................... B60R 25/24

FOREIGN PATENT DOCUMENTS

| CN | 106553617 A | 4/2017 |
|----|-------------|--------|
| JP | 2005-104327 | 4/2005 |
| JP | 2007-328602 | 12/2007 |
| JP | 2015-169008 | 9/2015 |

* cited by examiner

*Primary Examiner* — Kerri L McNally
(74) *Attorney, Agent, or Firm* — Oblon, McClelland, Maier & Neustadt, L.L.P.

(57) ABSTRACT

A key information management device includes: a reception unit configured to receive a movement request for moving a first vehicle, the first vehicle employing a key system in which locking and unlocking are performed by receiving key information on the first vehicle sent from at least one of a first terminal of a first user and a second terminal of a second user different from the first user; a storage unit configured to store the key information on the first vehicle and information on the first terminal to which the key information on the first vehicle has been delivered; and a control unit configured to send the key information on the first vehicle to the second terminal.

8 Claims, 14 Drawing Sheets

| VEHICLE ID | VEHICLE INFORMATION ||| AUTHENTICATION INFORMATION | VEHICLE POSITION | DELIVERY DESTINATION TERMINAL ID |
| --- | --- | --- | --- | --- | --- | --- |
| | VEHICLE TYPE | COLOR | NUMBER | | | |
| V001 | AAA | WHITE | ○○×× | XXYYZZ | ...... | T110 |

FIG. 13

| TERMINAL ID | TERMINAL POSITION |
|---|---|
| T001 | ...... |
| T002 | ...... |
| T003 | ...... |
| ⋮ | ⋮ |

KEY INFORMATION MANAGEMENT DEVICE AND KEY INFORMATION MANAGEMENT METHOD

INCORPORATION BY REFERENCE

The disclosure of Japanese Patent Application No. 2018-031589 filed on Feb. 26, 2018 including the specification, drawings and abstract is incorporated herein by reference in its entirety.

BACKGROUND

1. Technical Field

The present disclosure relates to a key information management device and a key information management method.

2. Description of Related Art

Recently, a system has been developed for making it possible to use a mobile terminal such as a smartphone as the key of a vehicle. In such a system, when the key information associated with a vehicle is sent from a mobile terminal to the vehicle, the vehicle is locked/unlocked and the vehicle becomes drivable.

SUMMARY

Although such a system is useful, there are problems that may be caused by a vehicle parked outside a parking lot. For example, a vehicle parked on a road may interfere with the traffic of emergency vehicles such as an ambulance. Normally, however, a vehicle can be locked/unlocked and moved only by a person, such as the owner of the vehicle, who carries a mobile terminal that has acquired the key information in advance. For example, a third party who does not have the key information cannot lock/unlock or move a vehicle parked on a road.

The present disclosure provides a key information management device and a key information management method that make it possible for a third party to lock/unlock a vehicle that employs a key system in which key information sent from a terminal is received for locking/unlocking the vehicle.

A first aspect of the disclosure provides a key information management device. The key information management device includes: a reception unit configured to receive a movement request for moving a first vehicle, the first vehicle employing a key system in which locking and unlocking are performed by receiving key information on the first vehicle sent from at least one of a first terminal of a first user and a second terminal of a second user different from the first user; a storage unit configured to store the key information on the first vehicle and information on the first terminal to which the key information on the first vehicle has been delivered; and a control unit configured to send the key information on the first vehicle to the second terminal.

According to the above configuration, the second user can lock and unlock the first vehicle and start the engine using the received key information on the first vehicle. For example, when the first vehicle obstructs the passage of an emergency vehicle, the second user who has received the key information on the first vehicle can unlock and move the first vehicle, minimizing a delay for the emergency vehicle to arrive at the destination.

In the first aspect, the second terminal may be a terminal transmitting the movement request.

In the first aspect, the control unit may be configured to send the key information on the first vehicle to the terminal transmitting the movement request when the terminal transmitting the movement request is registered in advance as a terminal carried by the second user who is permitted to move the first vehicle.

The configuration described above limits the sending destination of the key information on the first vehicle to the terminal registered in advance as a terminal that is carried by a user permitted to move the first vehicle, protecting the security of the first vehicle.

In the first aspect, the second terminal may be a terminal around the first vehicle.

In the first aspect, the control unit may be configured to detect the first vehicle parked on a planned route of a second vehicle different from the first vehicle.

In the first aspect, the terminal around the first vehicle may be a terminal present within a predetermined range from the first vehicle.

In the first aspect, the terminal around the first vehicle may be a terminal of a user belonging to a predetermined organization having jurisdiction over an area including a current position of the first vehicle. The configuration described above increases the possibility that the first vehicle has been moved out of the planned route before the second vehicle passes the point on the planned route where the first vehicle is parked, ensuring the smooth passage of the second vehicle on the planned route.

In the first aspect, the control unit may be configured to send a signal for prompting a movement of the first vehicle to the second terminal, together with the key information on the first vehicle. The configuration described above motivates the second user to unlock the first vehicle using the received key information and to move the first vehicle when the key information on the first vehicle is sent to the terminal of the second user who is a third party.

In the first aspect, the first vehicle may include a data communication device having a communication function, and the control unit may be configured to send an alert notification to the data communication device, and not to send the key information on the first vehicle to any terminal when a response to the alert notification is obtained from the data communication device. If a response to the alert notification sent to the data communication device, provided in the first vehicle, is obtained, it is apparent that an occupant is in the first vehicle. In this case, it is possible for the occupant to move the first vehicle. Therefore, if a response to the alert notification is obtained, the configuration described above does not send the key information on the first vehicle to any terminal, thus preventing the key information on the first vehicle from being unnecessarily sent to a third party.

A second aspect of the disclosure provides a key information management method. The key information management method includes: receiving, by a key information management device managing key information on a first vehicle, a movement request for moving the first vehicle employing a key system in which locking and unlocking are performed by receiving the key information on the first vehicle sent from at least one of a first terminal of a first user and a second terminal of a second user different from the first user; storing, in a storage unit, the key information on the first vehicle and information on the first terminal to which the key information on the first vehicle has been delivered; and sending the key information on the first vehicle to the second terminal.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13 is a diagram showing an example of a terminal management information table stored in a terminal management DB of the terminal management server;

DETAILED DESCRIPTION OF EMBODIMENTS

Embodiments of the present disclosure will be described below with reference to the drawings. Note that the configuration of the embodiments described below is an example and that the present disclosure is not limited to the configuration of the embodiments.

First Embodiment (Key System Outline)

Figure 1:
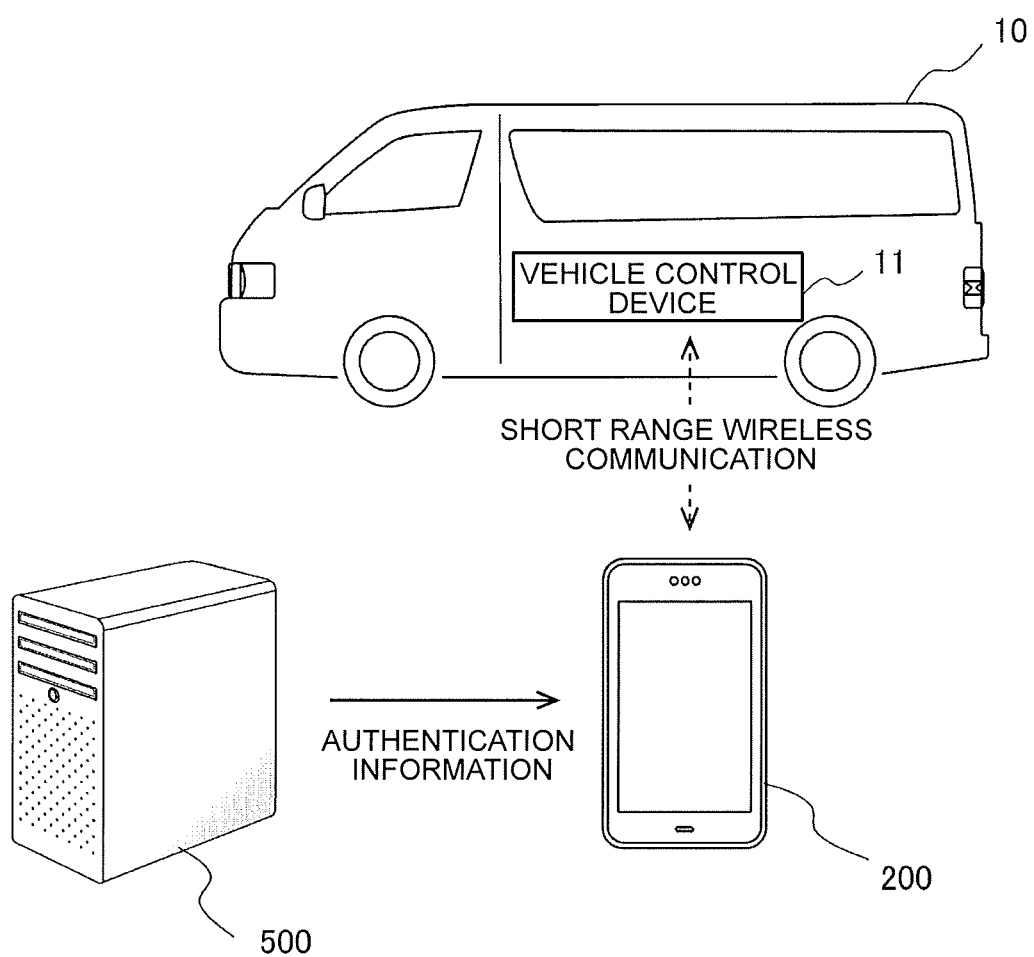
FIG. 1 is a diagram showing an overview of a key system according to a first embodiment.

FIG. 1 is a diagram showing an overview of a key system according to a first embodiment. The key system according to the first embodiment includes a vehicle control device 11 mounted on a vehicle 10, a user terminal 200, and a center server 500. The user terminal 200 and the center server 500 are connected to each other via a network such as the Internet that is a public communication network. The user terminal 200 and the vehicle control device 11 are connected to each other via short range wireless communication.

The center server 500 is a device that manages authentication information associated with the vehicle 10. The user terminal 200 can be used as the key of the vehicle 10 when the authentication information delivered from the center server 500 is received. When used as the key of the vehicle 10, the user terminal 200 sends, via short-range wireless communication, the authentication information, received from the center server 500, to the vehicle control device 11 mounted on the vehicle 10. The vehicle control device 11 performs authentication using the authentication information received from the user terminal 200. If the authentication is successful, the vehicle control device 11 can perform various control operations on the vehicle 10. The control operations the vehicle control device 11 performs on the vehicle 10 include the locking/unlocking of the door of the vehicle 10 and the driving of the vehicle 10. The authentication information is an example of "key information". The center server 500 is an example of the "key information management device".

(System Configuration of Key System)

Figure 2:
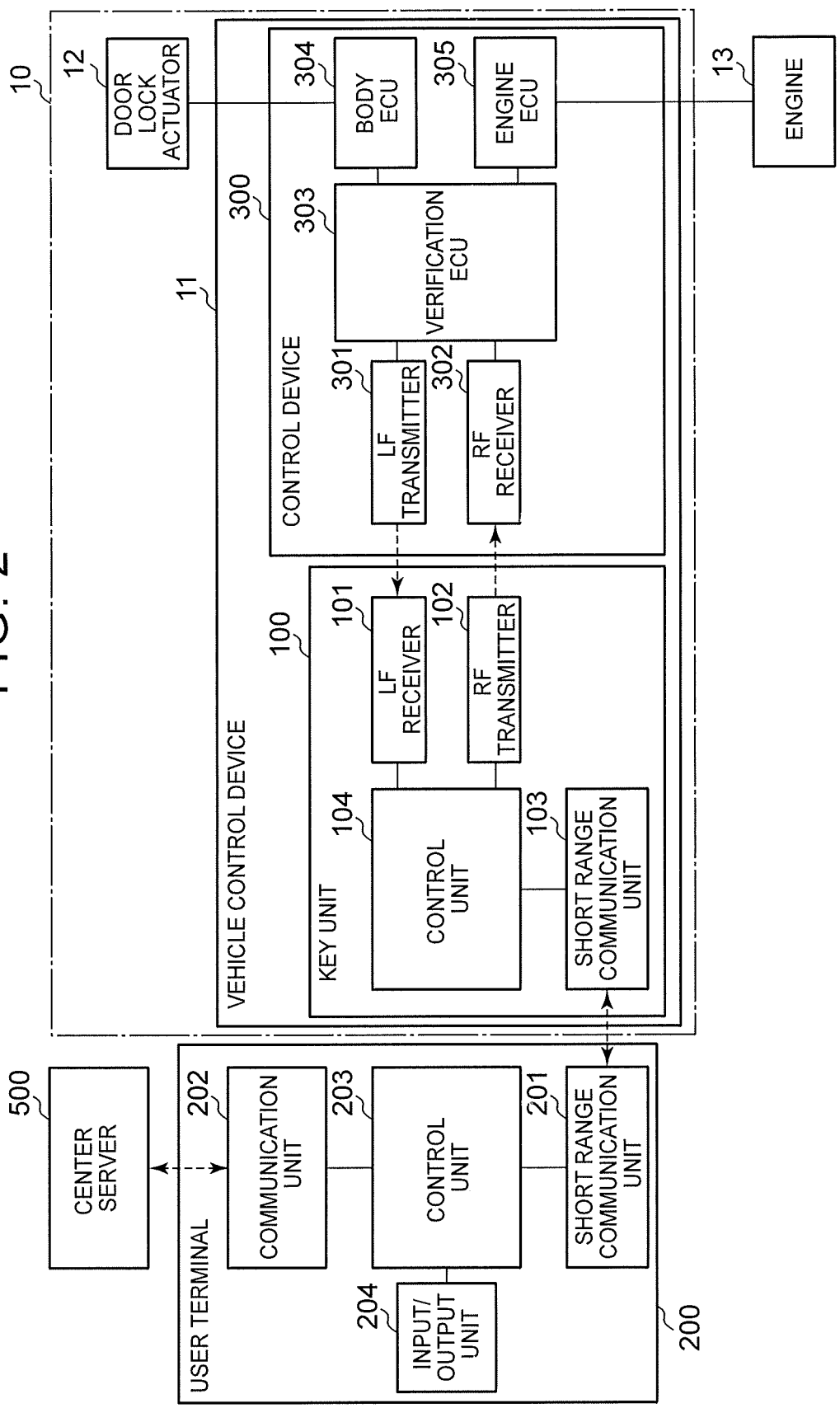
FIG. 2 is a diagram showing an example of the system configuration of the key system according to the first embodiment.

FIG. 2 is a diagram showing an example of the system configuration of the key system according to the first embodiment. FIG. 2 is a block diagram schematically showing an example of the configuration of the user terminal 200 and the vehicle control device 11 shown in FIG. 1. The vehicle control device 11 includes a key unit 100 that communicates with the user terminal 200 and a control device 300 that performs various control operations on the vehicle 10.

The control device 300 sends and receives radio waves in the radio frequency (hereinafter referred to as RF) band and radio waves in the low frequency (hereinafter referred to as LF) band to and from the key unit 100 in the vehicle 10 to perform various control operations. For example, the control device 300 controls a door lock actuator 12 of the vehicle 10 to perform locking/unlocking control for locking and unlocking the door of the vehicle 10. In addition, the control device 300 performs the engine control operation such as the start control for starting the engine 13 that is the drive source of the vehicle 10.

The control device 300 includes an LF transmitter 301, an RF receiver 302, a verification Electronic Control Unit (ECU) 303, a body Electronic Control Unit (ECU) 304, and an engine Electronic Control Unit (ECU) 305. The LF transmitter 301 is a device that sends radio waves in the LF band (for example, 100 KHz to 300 KHz) for searching for (polling) the key unit 100. The RF receiver 302 is a device that receives radio waves in the RF band (for example, 100 MHz to 1 GHz) sent from the key unit 100.

The verification ECU 303 is a computer that controls the body ECU 304 and the engine ECU 305 based on the command signal received from the key unit 100 via radio waves in the RF band. The verification ECU 303 is, for example, a microcomputer. The verification ECU 303 authenticates that the command signal sent from the key unit 100 is sent from a legitimate device. More specifically, the verification ECU 303 determines whether the key ID included in the command signal matches the key ID stored in advance in the storage unit of the verification ECU 303.

If the key ID is successfully authenticated, the verification ECU 303 sends the command, corresponding to the command signal, to the body ECU 304 and the engine ECU 305 via the in-vehicle network such as a Controller Area Network (CAN). More specifically, if the command signal received from the key unit 100 is the lock signal, the verification ECU 303 sends the lock command, which locks the vehicle 10, to the body ECU 304. If the command signal received from the key unit 100 is the unlock signal, the verification ECU 303 sends the unlock command, which unlocks the vehicle 10, to the body ECU 304. If the command signal received from the key unit 100 is the engine start permission signal, the verification ECU 303 sends the engine start permission command, which makes the engine 13 of the vehicle 10 ready for starting, to the engine ECU 305.

The body ECU 304 is a computer that controls the body of the vehicle 10. The body ECU 304 is electrically connected to the door lock actuator 12 that locks and unlocks the door of the vehicle 10. The body ECU 304 has a function to unlock and lock the vehicle 10 by controlling the door lock actuator 12 based on the unlock command or the lock command received from the verification ECU 303.

The engine ECU 305 is a computer that controls the engine 13 of the vehicle 10. The engine ECU 305 is electrically connected to various devices for controlling the engine 13, such as the fuel injection valve, the ignition plug, the throttle valve, and the starter (none shown). When the engine start permission command is received from the verification ECU 303, the engine ECU 305 enters the engine start enable state in which the stopped engine 13 can be started. The engine start enable state refers to the state in which the engine ECU 305 can start the engine 13 when the ignition switch (or the push start switch) is turned on in the vehicle 10. Note that the driving source of the vehicle 10 is not limited to an engine but may be another driving source such as a motor.

Next, the key unit 100 will be described. The key unit 100 is a device arranged in a predetermined position (for example, in a glove box) in the interior of the vehicle 10. The key unit 100 has two functions: one is the function to authenticate the user terminal 200 by carrying out short range wireless communication with the user terminal 200 and the other is the function to send the command signal to the control device 300 via radio waves in the RF band based on the authentication result. The key unit 100 includes an LF receiver 101, an RF transmitter 102, a short range communication unit 103, and a control unit 104.

The LF receiver 101 is a device that receives the polling signal sent from the control device 300 via radio waves in the LF band. The RF transmitter 102 is a device that sends the command signal to the control device 300 via radio waves in the RF band. The short range communication unit 103 is a device that communicates with the user terminal 200 outside the vehicle 10. The short range communication unit 103 performs short range communication (to the extent that communication can be performed between the interior and exterior of the vehicle) using a predetermined wireless communication standard. Examples of communication standards that can be used for communication by the short range communication unit 103 include Bluetooth (registered trademark) LowEnergy standard, Near Field Communication (NFC), Ultra Wideband (UWB), and WiFi (registered trademark).

The control unit 104 is a computer that performs processing for short range wireless communication with the user terminal 200, processing for authenticating the user terminal 200, and processing for sending the command signal to the control device 300. The control unit 104 is configured, for example, by a microcomputer.

The control unit 104 has the function to control the LF receiver 101, RF transmitter 102, and short range communication unit 103. In addition, the control unit 104 authenticates the authentication information included in the control request sent from the user terminal 200 via short range wireless communication. More specifically, the control unit 104 determines whether the authentication information sent from the user terminal 200 matches the authentication information stored in advance in the storage unit of the control unit 104. If this authentication is successful, the control unit 104 sends the command signal according to the control request, received from the user terminal 200, to the control device 300 via the RF transmitter 102. More specifically, if the control request received from the user terminal 200 is the lock request, the control unit 104 sends the lock signal to the control device 300. If the control request received from the user terminal 200 is the unlock request, the control unit 104 sends the unlock signal and the engine start permission signal to the control device 300.

At this time, the key unit 100 sends the key ID, together with the command signal, to the control device 300. The key ID may be previously stored in the key unit 100 in plaintext form or may be stored in encrypted form encrypted with a cryptogram specific to the user terminal 200. When the key ID is stored in encrypted form, the encrypted key ID may be decrypted with the authentication information sent from the user terminal 200 to obtain the original key ID.

Next, the user terminal 200 will be described. The user terminal 200 is a compact computer such as a smartphone, a mobile phone terminal, a tablet terminal, a personal information terminal, or a wearable computer (smart watch, etc.). The user terminal 200 includes a short range communication unit 201, a communication unit 202, a control unit 203, and an input/output unit 204.

The short range communication unit 201 is a device that communicates with the key unit 100 of the vehicle control device 11 using the same communication standard as that of the short range communication unit 103. The communication unit 202 is a device that connects the user terminal 200 to a network to communicate with the center server 500. The communication unit 202 can communicate with the center server 500 via the network using a mobile communication service such as 3G or LTE. As will be described later, the communication unit 202 of the user terminal 200 communicates also with the terminal management server, which manages user terminals, via the network.

The control unit 203 is a computer that controls the user terminal 200. The control unit 203 is configured, for example, by a microcomputer. The control unit 203 receives the authentication information delivered from the center server 500 via the communication unit 202. The authentication information received from the center server 500 is stored in the storage unit of the control unit 203. The control unit 203 also generates the control request in response to an input operation of a terminal user having the user terminal 200, and sends the generated control request, together with authentication information stored in the storage unit, to the key unit 100 via the short range communication unit 201.

The input/output unit 204 also functions as a unit that accepts an input operation of the terminal user and that presents the information to the terminal user. More specifically, the input/output unit 204 is configured to include a touch panel display and its control unit. The input/output unit 204 may include a hardware switch operated by a terminal user. In addition, the input/output unit 204 may include a speaker that outputs sound or voice under the control of the control unit 203.

(Key System Operation)

Figure 3:
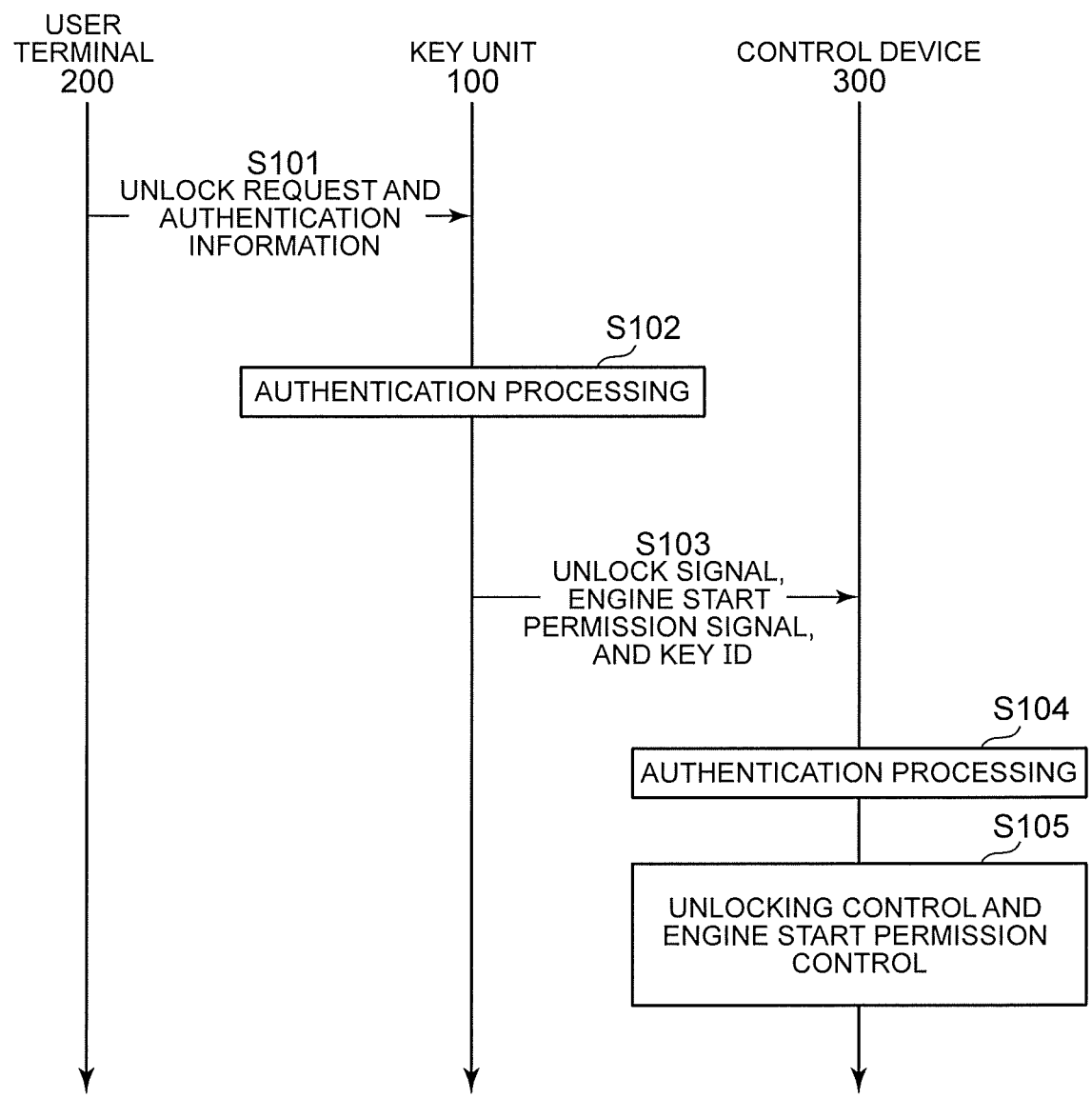
FIG. 3 is a diagram showing the flow of processing and data when the door of a vehicle is unlocked.

The following describes an example of key system operation that is performed when the user controls the vehicle 10 using the user terminal 200. In this example, the door of the vehicle 10 is unlocked. FIG. 3 is a diagram showing the flow of processing and data when the door of the vehicle 10 is unlocked.

When the user performs an operation on the user terminal 200 to unlock the door of the vehicle 10, the user terminal 200 sends the authentication information, together with the unlock request, to the key unit 100 of the vehicle control device 11 (S101). Then, the key unit 100 performs the authentication processing based on the authentication information received from the user terminal 200 (S102). If this authentication information is authenticated successfully, the key unit 100 sends the key ID, together with the unlock signal and the engine start permission signal, to the control device 300 (S103). Then, the control device 300 performs the authentication processing based on the key ID received from the key unit 100 (S104). If this key ID is authenticated successfully, the control device 300 performs the unlocking control for unlocking the door of the vehicle 10 and the engine start permission control for putting the engine ECU 305 in the engine start enable state (S105).

(Key Information Management System)

Next, a key information management system will be described below. In this key information management system, the authentication information on a vehicle that employs the above-described key system is delivered to the user terminal of a third party, other than the driver of the vehicle, so that the third party can move the vehicle. For example, a vehicle parked on the road on the route of an emergency vehicle may delay the arrival of the emergency vehicle to the site. When there is a request for moving an unattended vehicle such as the one described above, the key information management system according to the first embodiment temporarily delivers the authentication information on this vehicle to the user terminal of a third party so that the third party can move the vehicle.

The third party refers to a user other than a user who has been successfully authenticated as a legitimate user and owns a terminal to which the authentication information on the vehicle has already been delivered. A user successfully authenticated as a legitimate user is, for example, the vehicle owner, a family member of the owner, an employee of the owner, or a user who has obtained permission to use the vehicle from the owner. When the vehicle is a shared car used by an unspecified number of users, the user is also a legitimate user if the user's request to use the vehicle has been permitted.

Figure 4:
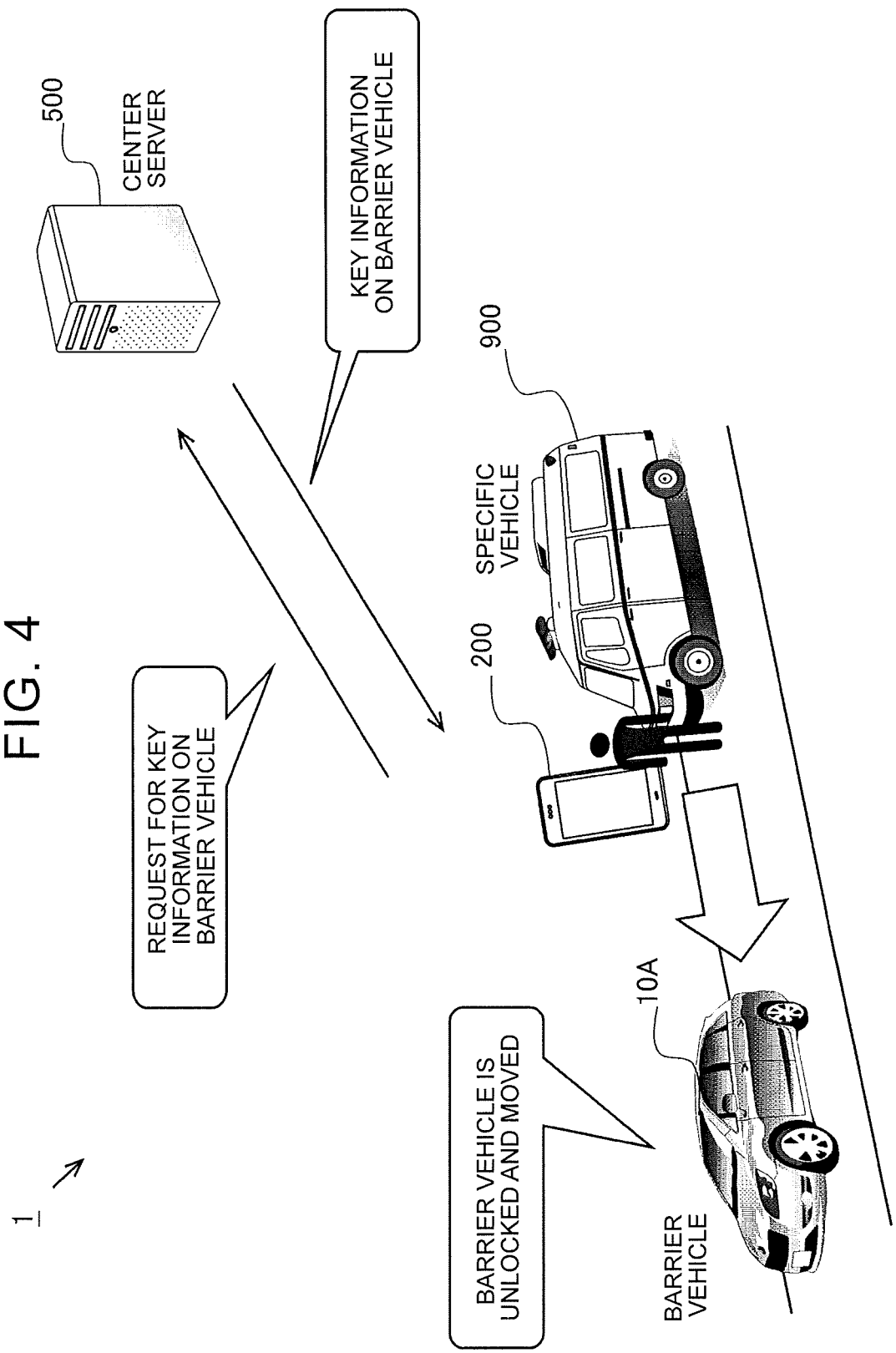
FIG. 4 is a diagram showing an example of the system configuration of a key information management system according to the first embodiment.

FIG. 4 is a diagram showing an example of the system configuration of a key information management system 1A according to the first embodiment. The key information management system 1A includes a vehicle 10A, a vehicle 900, a center server 500, and a user terminal 200. The vehicle 10A and the user terminal 200 are connected to the center server 500 over the network, such as the Internet that is a public communication network, for example, via a wireless access network.

The vehicle 10A is a vehicle that employs the key system. For example, the vehicle 10A is parking on the road and is an obstacle to the passage of other vehicles. In the description below, a vehicle that obstructs the passage of another vehicle is referred to as a barrier vehicle. The vehicle 900 is an emergency vehicle whose passage is prioritized, such as an ambulance, a fire truck, and a police car. In the description below, a vehicle, such as an emergency vehicle whose passage is prioritized, is referred to as a specific vehicle. The user terminal 200 is a terminal carried by a user in the specific vehicle 900 such as an emergency personnel. Specific vehicles are not limited to emergency vehicles.

For example, when the passage is obstructed by the barrier vehicle 10A while the specific vehicle 900 is traveling to a site, the occupant of the specific vehicle 900 sends a barrier vehicle movement request from the user terminal 200 to the center server 500. The center server 500 manages the information, such as the authentication information, on the vehicle 10A that employs the key system. Although the center server 500 manages a plurality of vehicles 10A, FIG. 4 shows only one of them.

The center server 500 receives the barrier vehicle movement request from the user terminal 200 and, in response to this request, sends the authentication information on the barrier vehicle 10A back to the user terminal 200. The user terminal 200 stores the authentication information on the barrier vehicle 10A, received from the center server 500, in the storage unit.

The occupant of the specific vehicle 900, who carries the user terminal 200, approaches the barrier vehicle 10A and performs the unlocking operation for the user terminal 200. Then, the barrier vehicle 10A is unlocked and enters the engine start enable state. In addition, the occupant of the specific vehicle 900 gets in the barrier vehicle 10A and performs the engine start operation for starting the engine of the barrier vehicle 10A. By doing so, the occupant of the specific vehicle 900 can move the barrier vehicle 10A. This allows the barrier vehicle 10A to be moved from the route of the specific vehicle 900 to another position, making it possible for the specific vehicle 900 to travel along the route.

The barrier vehicle movement request is an example of the "movement request". The barrier vehicle is an example of the "first vehicle". The driver of the barrier vehicle 10A is an example of the "first user to whom the key information on the first vehicle has been delivered". The occupant of the specific vehicle 900 is an example of the "second user different from the first user" and the "user permitted to move the first vehicle". The user terminal 200 is an example of the "terminal of the second user", "the terminal of the sending source of the movement request", and "the terminal registered in advance as a terminal carried by the user who is permitted to move the first vehicle".

Figure 5:
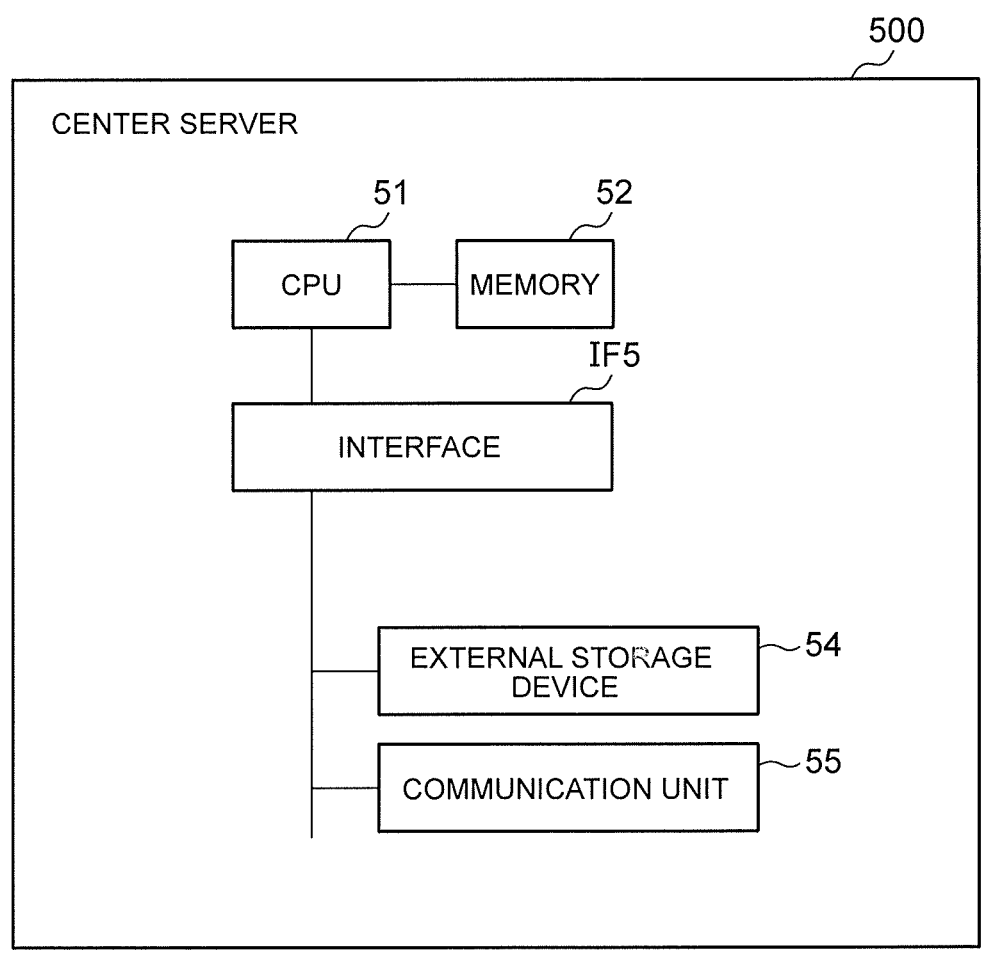
FIG. 5 is a diagram showing an example of the hardware configuration of a center server.

FIG. 5 is a diagram showing an example of the hardware configuration of the center server 500. The center server 500 includes a CPU 51, a memory 52, an interface IF5, an external storage device 54, and a communication unit 55. The CPU 51 performs the processing as the center server 500 by executing a computer program that is expanded into the memory 52 in the executable form. The memory 52 stores computer programs to be executed, and data to be processed, by the CPU 51. The memory 52 is a memory such as a Dynamic Random Access Memory (DRAM), a Static Random Access Memory (SRAM), or a Read Only Memory (ROM).

The external storage device 54 and the communication unit 55 are connected to the interface IF5. The external storage device 54 is a nonvolatile storage device, such as a Solid State Drive (SSD) or a hard disk drive. The communication unit 55 connects to a public communication network via a LAN and communicates with various servers on the network, the user terminal 200, and the vehicle 10A through a public communication network.

Although the interface IF5 is shown in FIG. 5, the signal transfer path through which signals are transferred between the CPU 51 and a controlled object is not limited to the interface IF5. That is, the CPU 51 may have a plurality of signal transfer paths other than the interface IF5. In FIG. 5, the center server 500 has a single CPU 51. Note that the CPU is not limited to a single-processor configuration but may be a multiprocessor configuration. A single CPU connected by a single socket may have a multi-core configuration. At least a part of the processing of each of the above units may be performed by a processor other than the CPU, for example, by a dedicated processor such as Digital Signal Processor (DSP) or Graphics Processing Unit (GPU). In addition, at least a part of the processing of each of the above units may be performed by an integrated circuit (IC) or other digital circuits. Also, an analog circuit may be included in at least a part of each of the above components.

Figure 6:
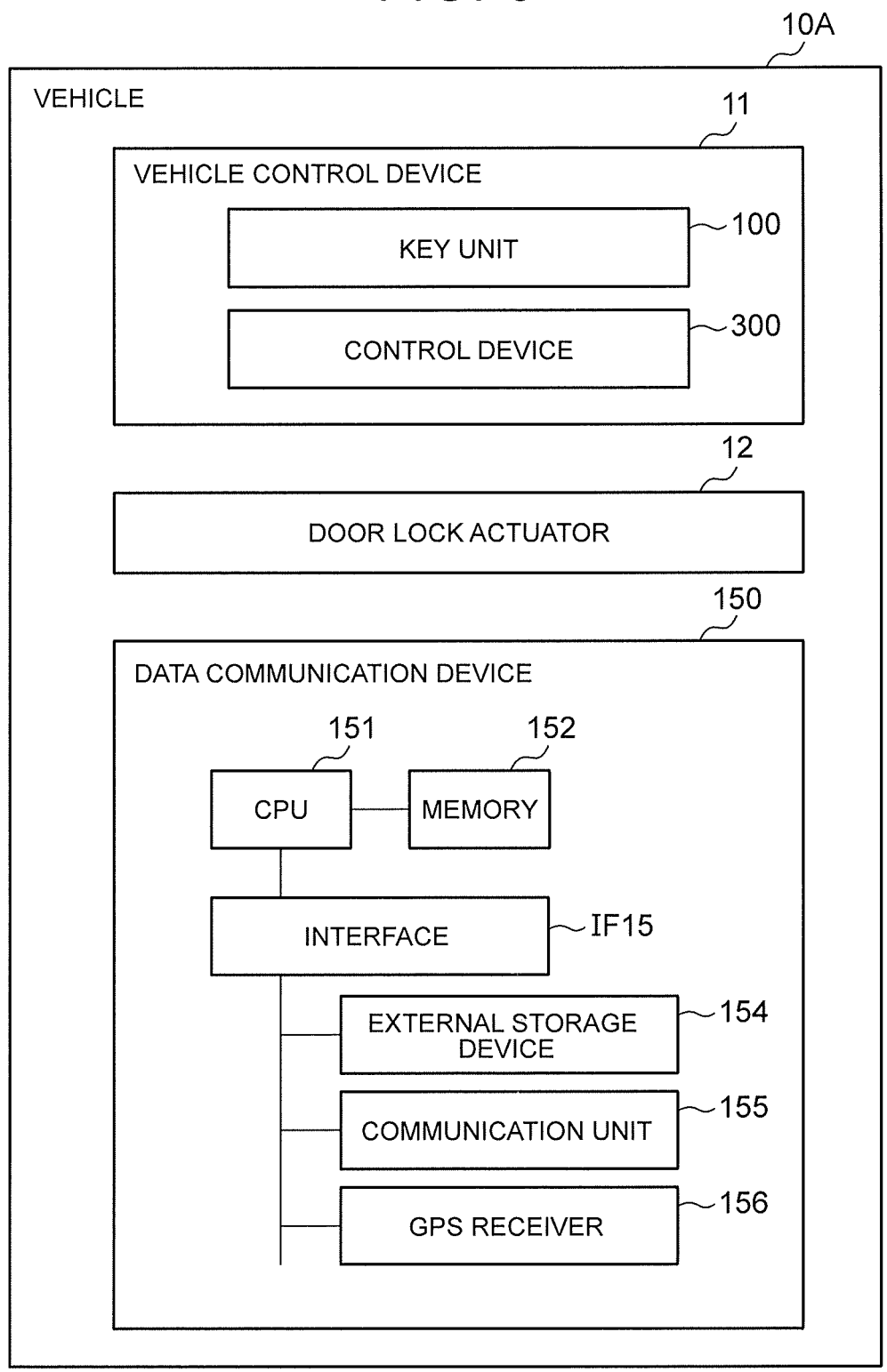
FIG. 6 is a diagram showing an example of the hardware configuration of a barrier vehicle.

FIG. 6 is a diagram showing an example of the hardware configuration of the barrier vehicle 10A. FIG. 6 shows only the hardware configuration related to the control of the vehicle 10A and omits the configuration related to traveling (engine, etc.). The barrier vehicle 10A includes the vehicle control device 11, the door lock actuator 12, and a data communication device 150. The vehicle control device 11 and the door lock actuator 12 are as described above. The data communication device 150 is a device that has the function to communicate with other devices such as the center server 500.

The data communication device 150 includes a CPU 151, a memory 152, an interface IF15, an external storage device 154, a communication unit 155, and a Global Positioning System (GPS) receiver 156. The configuration and the operation of the CPU 151, memory 152, interface IF15, external storage device 154, and communication unit 155 are similar to those of the CPU51, memory 52, interface IF5, external storage device 54, and communication unit 55 in FIG. 5.

The GPS receiver 156 receives the radio waves of time signals from a plurality of artificial satellites (Global Positioning Satellite) circling around the earth and stores the received signals in the register (not shown) in the CPU 151. The CPU 151 calculates the latitude and longitude, which is a position on the earth, from the detected signals received from the GPS receiver 156 for acquiring the position information on the vehicle 10A.

The data communication device 150 is electrically connected to the vehicle control device 11, for example, through the CAN. Therefore, from the vehicle control device 11, the data communication device 150 may receive the notification indicating that the door of the vehicle 10 has been locked and unlocked and, then, notify the center server 500 about the received notification. The data communication device 150 is an example of the "data communication device".

The hardware configuration of the vehicle 10A shown in FIG. 6 is exemplary only and the present disclosure is not limited thereto. For example, the data communication device 150 may include a portable recording medium drive device from which programs and data are read for use in processing. Examples of the portable recording medium include a flexible disk, a magneto optical disk, a CD-ROM, a CD-R/W, a DVD, a Blu-ray disk, a DAT, an 8 mm tape, and a memory card such as a flash memory.

Figure 7:
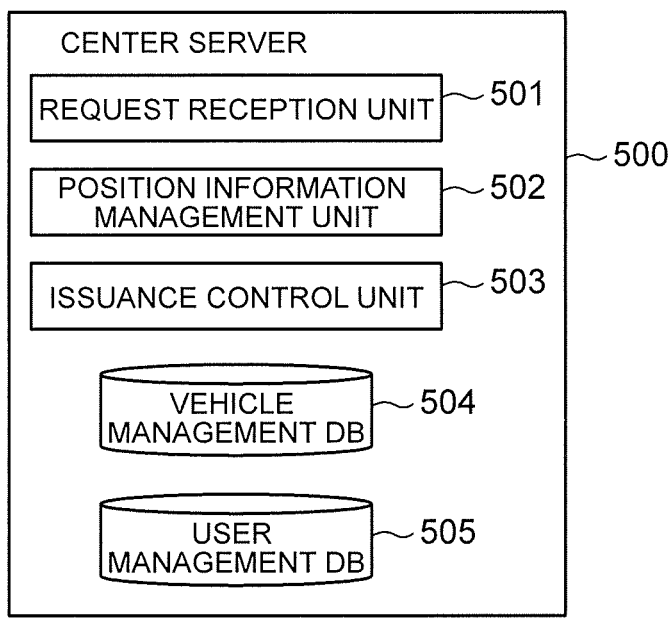
FIG. 7 is a diagram showing an example of the functional configuration of the center server and a vehicle according to the first embodiment.

FIG. 7 is a diagram showing an example of the functional configuration of the center server 500 and the vehicle 10A in the key information management system 1A according to the first embodiment. The center server 500 operates as one of the components illustrated in FIG. 7 when the corresponding computer program is executed in the memory 52. That is, as the functional components, the center server 500 includes a request reception unit 501, a position information management unit 502, an issuance control unit 503, a vehicle management database (DB) 504, and a user management DB 505.

The request reception unit 501 receives the barrier vehicle movement request from the user terminal 200. In addition to the barrier vehicle movement request, the request reception unit 501 also receives the following from the user terminal 200: the vehicle identification information that identifies the barrier vehicle such as the number, vehicle type, and color, the position information on the user terminal 200, and the identification information on the user terminal 200. For example, as the vehicle identification information, the request reception unit 501 may receive an image including the barrier vehicle photographed by the camera provided in the user terminal 200. The request reception unit 501 is an example of the "reception unit".

The position information management unit 502 receives the position information that is sent at predetermined intervals from each of the plurality of the vehicles 10A managed in the key information management system 1A. The position information management unit 502 registers the received position information in the vehicle management DB 504 that will be described later.

The issuance control unit 503 identifies the barrier vehicle 10A from the vehicle identification information and the position information on the user terminal 200 (the sending source) both of which are received together with the movement request when the barrier vehicle movement request is received. The issuance control unit 503 acquires the authentication information on the identified barrier vehicle 10A from the vehicle management DB 504 that will be described later. Then, based on the acquired authentication information, the issuance control unit 503 issues the authentication information for the user terminal 200, which is the sending source of the movement request, and sends the issued authentication information to the user terminal 200. In addition, when the lock notification is received from the barrier vehicle 10A, the issuance control unit 503 invalidates the authentication information for the user terminal 200 that is the sending destination of the authentication information on the barrier vehicle 10A. The issuance control unit 503 is an example of the "control unit".

The vehicle management DB 504 and the user management DB 505 are created in the external storage device 54 of the center server 500. The vehicle management DB 504 stores a vehicle management information table that holds the information on each vehicle 10A in the key information management system 1A. The information on the vehicle 10A also includes the authentication information on the vehicle 10A. Details of the vehicle management information table will be described later. The vehicle management DB 504 is an example of the "storage unit".

The user management DB 505 holds the information on the occupants of the specific vehicle 900 such as emergency personnel, firefighters, and crew members of emergency vehicles. In the description below, the occupants of the specific vehicle 900 will be referred to as specific users. More specifically, the user management DB 505 holds, for each organization, the user identification information on specific users and the identification information on the user terminals 200 of specific users.

Any one of the functional components of the center server 500 or a part of the processing thereof may be executed by another computer connected to the network. In addition, the series of processing executed by the center server 500 may be executed not only by hardware but also by software.

Next, the vehicle 10A operates as one of the components illustrated in FIG. 7 when the corresponding computer program is executed in the memory. That is, as the functional components, the vehicle 10A includes an authentication information reception unit 131, a locking/unlocking control unit 132, a control unit 133, a sending/receiving unit 134, and a position information acquisition unit 135. The authentication information reception unit 131 corresponds to the key unit 100. The locking/unlocking control unit 132 corresponds to the control device 300. The control unit 133, sending/receiving unit 134, and position information acquisition unit 135 are functional components each achieved when the CPU 151 of the data communication device 150 executes the corresponding computer program in the memory 152.

The authentication information reception unit 131 receives the authentication information from the user terminal 200 through short range communication and, based on the received authentication information, authenticates the user terminal 200. If the authentication is successful, the authentication information reception unit 131 outputs the control request, received from the user terminal 200, to the locking/unlocking control unit 132. The control requests received from the user terminal 200 include, for example, the lock request and the unlock request.

The locking/unlocking control unit 132 performs the operation, for example, locks/unlocks the door of the vehicle 10A or starts the engine ECU 305, according to the control request received from the authentication information reception unit 131.

The sending/receiving unit 134, the interface with the center server 500, sends data, received from other functional components, to the center server 500 and outputs data, received from the center server 500, to the control unit 133.

The position information acquisition unit 135 acquires the position information on the vehicle 10A, acquired by the GPS receiver 156 of the data communication device 150, at predetermined intervals and sends the acquired position information to the center server 500. The position information on the vehicle 10A is, represented, for example, by latitude and longitude. The position information on the vehicle 10A may be represented also by the address.

The control unit 133 receives an alert, which confirms whether the driver is in the vehicle, from the center server 500 via the sending/receiving unit 134. The control unit 133 outputs the received alert to the speaker and the display provided in the data communication device 150. When a response to the alert is received from the user interface provided in the data communication device 150, the control unit 133 sends the received response to the center server 500 through the sending/receiving unit 134.

When the door unlock or lock notification is received from the locking/unlocking control unit 132, the control unit 133 sends the unlock notification or the lock notification to the center server 500 via the sending/receiving unit 134. When the lock notification is sent, the position information on the vehicle 10A is also sent.

Figure 8:
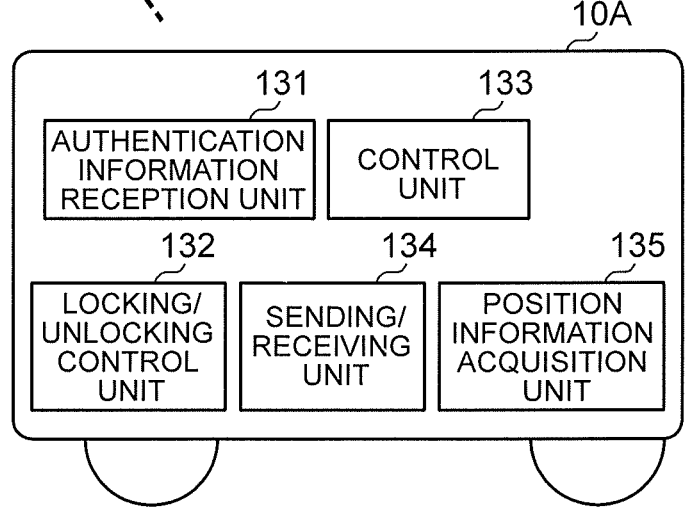
FIG. 8 is a diagram showing an example of a vehicle management information table.

FIG. 8 is a diagram showing an example of the vehicle management information table. The vehicle management information table is stored in the vehicle management DB 504 of the center server 500. The vehicle management information table has the following fields: vehicle ID, vehicle information, authentication information, vehicle position, and delivery destination terminal ID. In the vehicle ID field, the identification number associated with each vehicle is stored.

In the vehicle information field, the information for identifying the vehicle is stored. The vehicle information field has the following three subfields: vehicle type, color, and number (vehicle registration number). The vehicle information field may include other subfields as necessary.

In the authentication information field, the authentication information used in the above-described key system is stored. The authentication information that is sent to the user terminal 200 is generated based on the authentication information stored in the authentication information field. The authentication information that is sent to the user terminal 200 may be a one-time key or may be a limited key that is valid only for a predetermined time period. Regardless of the type of authentication information, it is assumed that the authentication information corresponding to the authentication information stored in this field is stored in advance in the key unit 100. The issuance control unit 503 reads the authentication information stored in the authentication information field corresponding to the barrier vehicle 10A and sends this authentication information to the user terminal 200 that is the sending source of the barrier vehicle movement request. When the authentication information that is sent to the user terminal 200 is a one-time key, the issuance control unit 503 uses the authentication information, stored in the authentication information field corresponding to the barrier vehicle 10A, to generate the authentication information to be sent to the user terminal 200 and then sends the generated authentication information.

In the vehicle position field, the position information on the vehicle 10A is stored. The position information on the vehicle 10A is sent from the vehicle 10A to the center server 500 at predetermined intervals. When the position information is received from the vehicle 10A, the position information management unit 502 of the center server 500 updates the value of the vehicle position field of the corresponding vehicle 10A in the vehicle management information table using the received position information.

In the delivery destination terminal ID field, the identification information on a terminal to which the authentication information on the vehicle 10A has been delivered is stored. In other words, a terminal whose identification information is stored in the delivery destination terminal ID field is the terminal of a user who is successfully authenticated as a legitimate user. A user successfully authenticated as a legitimate user is, for example, the owner of the vehicle 10A, a family member of the owner, or a user who has obtained permission to use the vehicle 10A from the owner of the vehicle 10A. When the vehicle 10A is a shared car used by an unspecified number of users, the user is also a legitimate user if the user's request to use the vehicle 10A has been permitted.

When the barrier vehicle movement request is sent from the user terminal 200 of a specific user and, in response to the request, the authentication information on the vehicle 10A is sent back to that user terminals 200, the identification information on that user terminal 200 is not stored in the distribution destination terminal ID field. This is because this user terminal 200 is the terminal of a user registered in advance as a user to whom the authentication information on the vehicle 10A is temporarily sent only at emergency time but is not the terminal of a user authenticated as a legitimate user of the vehicle 10A. That is, in the first embodiment, a third party refers to the owner of a user terminal whose identification information is not stored in the delivery destination terminal ID field for the vehicle 10A.

The identification information on the user terminal 200 that is the sending destination of the authentication information on the vehicle 10A issued in response to the barrier vehicle movement request is stored, not in the vehicle management information table, but temporarily in the memory 52 (not shown) in association with the identification information on the vehicle 10A. The association between the identification information on the user terminal 200 and the identification information on the vehicle 10A is deleted from the memory 52 when a predetermined time has elapsed or when the authentication information is invalidated for the user terminal 200.

<Processing Flow>

Figure 9:
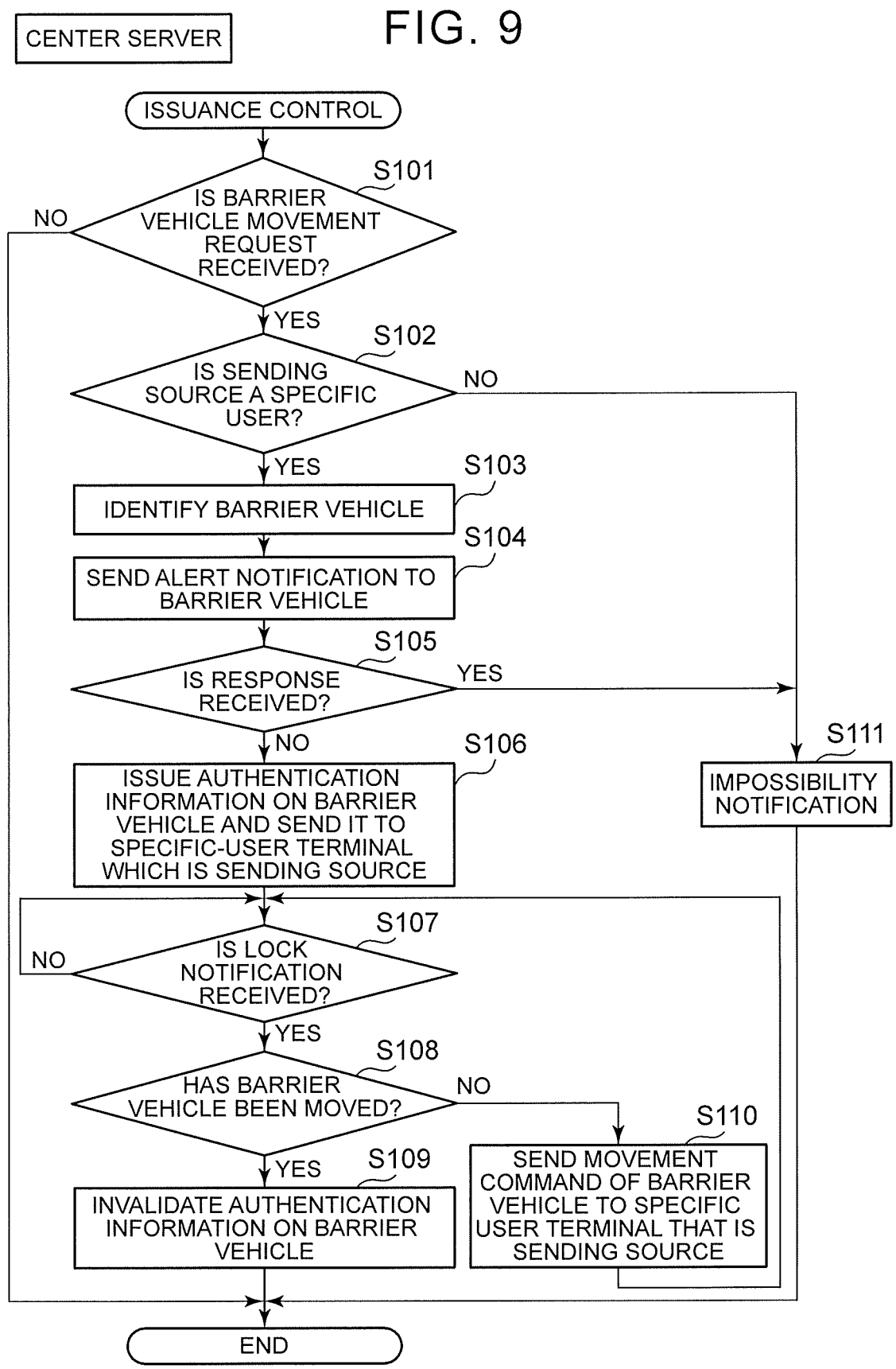
FIG. 9 is a diagram showing an example of the flowchart of the processing of an issuance control unit of the center server according to the first embodiment.

FIG. 9 is a diagram showing an example of the flowchart of the processing of the issuance control unit 503 of the center server 500 according to the first embodiment. The processing shown in FIG. 9 is repeated at predetermined intervals. Although performed actually by the CPU 51 of the center server 500, the processing shown in FIG. 9 is described below assuming that the processing is performed by the issuance control unit 503, one of the functional components, for the sake of description. Similarly, in the description of the flowcharts in the figures following FIG. 9, the processing is described assuming that the processing is performed by the functional components.

In step S101, the issuance control unit 503 determines whether the barrier vehicle movement request is received. If the barrier vehicle movement request is received (S101: YES), the processing proceeds to S102. If the barrier vehicle movement request is not received (S101: NO), the processing shown in FIG. 9 is terminated.

In S102, the issuance control unit 503 determines whether the user terminal of the sending source of the barrier vehicle movement request is the user terminal of a specific user. Since the identification information on the user terminal 200 of the sending source is received together with the barrier vehicle movement request, the issuance control unit 503 makes the determination in S102 according to whether the received identification information on the user terminal 200 is registered in the user management DB 505. In FIG. 9, the user terminal 200 of a specific user is denoted as a "specific-user terminal".

If the user terminal of the sending source of the barrier vehicle movement request is the user terminal 200 of a specific user (S102: YES), the processing proceeds to S103. If the user terminal of the sending source of the barrier vehicle movement request is not the user terminal 200 of a specific user (S102: NO), the processing proceeds to S111. In S111, the rejection notification is sent to the user terminal 200 of the sending source of the barrier vehicle movement request.

In S103, the issuance control unit 503 identifies the barrier vehicle. More specifically, together with the barrier vehicle movement request, the vehicle identification information on the barrier vehicle and the identification information and the position information on the user terminal 200 of the sending source are received. The issuance control unit 503 identifies an entry in the vehicle management information table whose value in the vehicle information field matches the value of the received vehicle identification information. For example, the issuance control unit 503 compares the value of the position information field of the identified entry with the value of the received position information on the user terminal 200. If the distance between the two positions indicated by the two pieces of position information is less than the predetermined threshold value, the issuance control unit 503 identifies that the vehicle 10A corresponding to the identified entry of the vehicle management information table is a barrier vehicle. If a barrier vehicle is not identified, the processing may proceed to S111.

In S104, the issuance control unit 503 sends an alert notification to the barrier vehicle 10A. The alert notification is, for example, the alert sound sounding command or the message that prompts the movement of the barrier vehicle 10A. The alert notification is an example of the "alert notification".

In S105, the issuance control unit 503 determines whether a response to the alert notification, sent in S104, is received. For example, if a response is not received even after a predetermined time has elapsed since the alert notification was sent, the condition in S105 is negatively determined. If a response to the alert notification, sent in S104, is received (S105: YES), the processing proceeds to S111. In S111, the rejection notification is sent to the user terminal 200 of the sending source of the barrier vehicle movement request. If a response to the alert notification, sent in S104, is not received (S105: NO), the processing proceeds to S106. The response to the alert notification is an example of "the response to an alert notification".

In S106, the issuance control unit 503 issues the authentication information on the barrier vehicle 10A for the user terminal 200, which is the sending source of the movement request, and sends the issued authentication information to the user terminal 200. Note that issuing the authentication information means that, if the authentication information to be sent to the user terminal 200, which is the sending source of the movement request, is a one-time key, the issuance control unit 503 creates a one-time key based on the authentication information stored in the authentication information field of the entry in the vehicle management information table corresponding to the barrier vehicle 10A.

In S107, the issuance control unit 503 determines whether the lock notification is received from the barrier vehicle 10A. If the lock notification is received (S107: YES), the processing proceeds to S108. If the lock notification is not received (S107: NO), the issuance control unit 503 enters the standby state until the lock notification is received. If the lock notification is not received from the barrier vehicle 10A even after the predetermined time has elapsed, the processing may proceed to S109 or S110.

In S108, the issuance control unit 503 determines whether the barrier vehicle 10A has been moved. To do so, the issuance control unit 503 stores, in the memory, the position information on the barrier vehicle 10A corresponding to the time when the authentication information was issued in S106 (that is, the position information stored in the position information field of the entry of the vehicle management information table corresponding to the barrier vehicle 10A). On the other hand, the position information on the barrier vehicle 10A is received, together with the lock notification, from the barrier vehicle 10A. The issuance control unit 503 compares the received position information with the position information stored in the memory. If the distance between the two positions indicated by the two pieces of position information is equal to or larger than the predetermined threshold value, it is determined that the barrier vehicle 10A has been moved.

If the barrier vehicle 10A has been moved (S108: YES), the processing proceeds to S109. If the barrier vehicle 10A has not been moved (S108: NO), the processing proceeds to S110.

In S109, the issuance control unit 503 invalidates the authentication information on the barrier vehicle 10A. This invalidation processing may be any processing as long as the specific user cannot lock/unlock the barrier vehicle 10A any more using the already issued authentication information. Some examples of this invalidation processing are given below.

(1) The center server 500 instructs the user terminal 200 to delete the authentication information. (2) The center server 500 instructs the user terminal 200 to set the invalidation flag of the authentication information. In this case, the user terminal 200 does not send the authentication information, for which the invalidation flag set, to the barrier vehicle 10A via short-range wireless communication. (3) The center server 500 instructs the user terminal 200 to rewrite the expiration date, included in the authentication information, to a past date and time. (4) The center server 500 instructs the user terminal 200 that the authentication information is invalid and that the authentication information should not be sent to the barrier vehicle 10A. (5) The center server 500 instructs the key unit 100 via the data communication device 150 that the authentication information is invalid and should not be accepted. (6) The center server 500 instructs the key unit 100 via the data communication device 150 not to accept the authentication information from the user terminal 200.

The invalidation processing shown in the above (1) to (4) is the processing the center server 500 performs for the user terminal 200. The invalidation processing shown in the above (5) to (6) is the processing the center server 500 performs for the key unit 100. The invalidation processing may be performed either for the user terminal 200 or for the key unit 100. However, since the communication between the user terminal 200 and the center server 500 and the communication between the data communication device 150 and the center server 500 are not always good, it is preferable that the both be performed. After the processing in S109, the processing shown in FIG. 9 is terminated.

In S110, the issuance control unit 503 sends the movement command of the barrier vehicle 10A to the user terminal 200, which is the sending source of the movement request, to prompt the movement of the barrier vehicle 10A. After that, the processing proceeds to S107.

The processing of the issuance control unit 503 shown in FIG. 9 is an example, and the present disclosure is not limited to the processing described above. For example, the processing in S102, S104, and S105 to S110 may be selectively performed according to the embodiment. In addition, instead of the processing in S107 in which the issuance control unit 503 determines whether the lock notification is received, the issuance control unit 503 may determine whether the unlock notification is received or whether the engine start notification is received.

Figure 10:
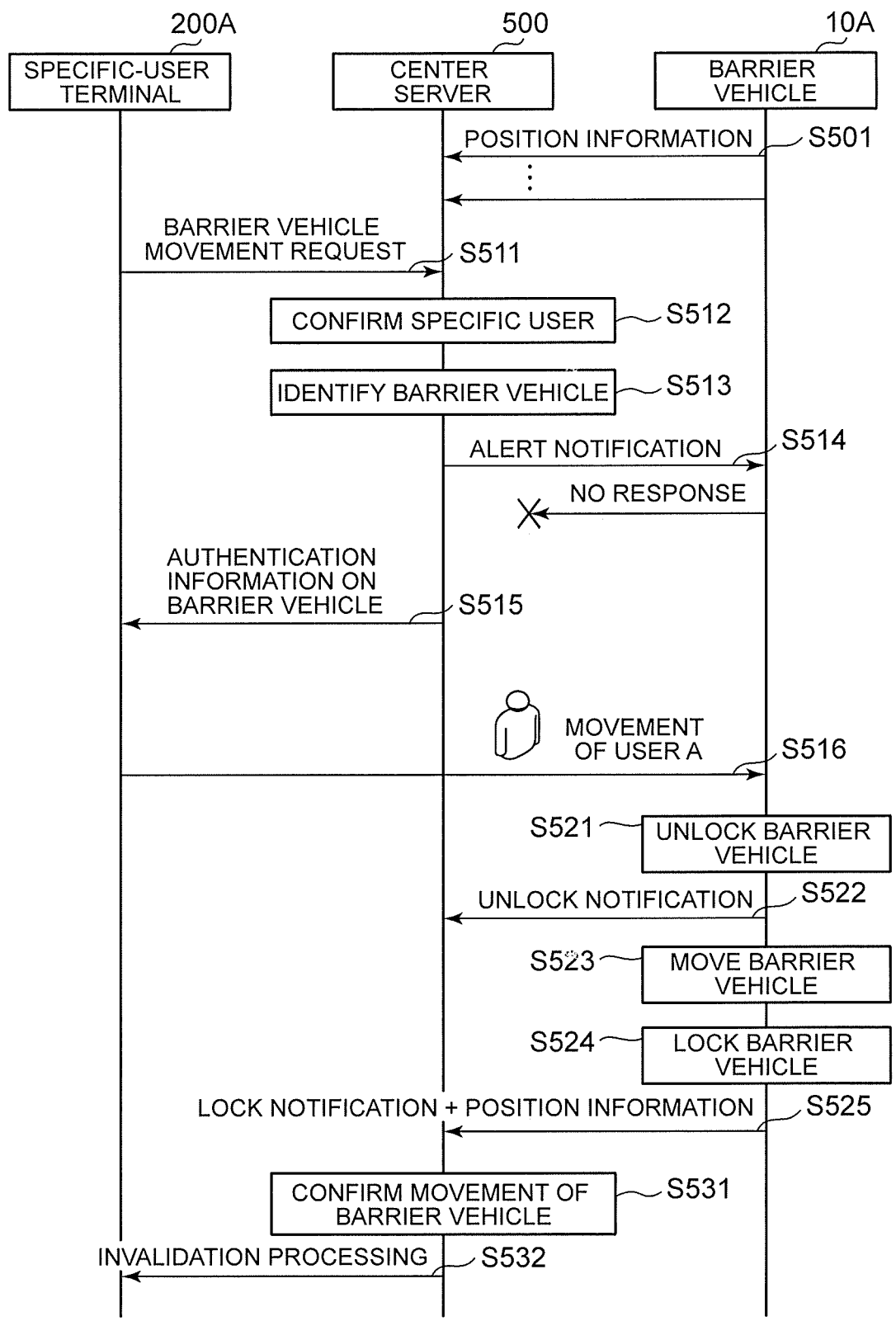
FIG. 10 is a diagram showing an example of the processing sequence in a specific example of the first embodiment.

FIG. 10 is a diagram showing an example of the processing sequence of one specific example of the first embodiment. In this specific example, the specific user A sends the barrier vehicle movement request to move the barrier vehicle 10A that prevents the specific vehicle 900 from proceeding.

In S501, the barrier vehicle 10A sends the position information to the center server 500 at predetermined intervals. Although not shown, the position information is sent from the barrier vehicle 10A to the center server 500 at predetermined intervals also from this time on. The barrier vehicle 10A is, for example, a vehicle parked on the road, and it is assumed that an occupant such as the driver is not in the vehicle.

In S511, the specific vehicle 900 in which the specific user A rides approaches the barrier vehicle 10A. Since the barrier vehicle 10A prevents the specific vehicle 900 from proceeding, the specific user A sends the barrier vehicle movement request to the center server 500 via the user terminal 200. The center server 500 receives the barrier vehicle movement request from the user terminal 200A of the specific user A (S101: YES in FIG. 9). Note that, together with the barrier vehicle movement request, the vehicle identification information on the barrier vehicle 10A and the identification information and the position information on the user terminal 200A, which is the sending source, are also sent.

In S512, the center server 500 confirms that the sending source of the barrier vehicle movement request is the user terminal 200A of the specific user A (S102: YES in FIG. 9). In S513, based on the vehicle management information table, the center server 500 identifies the vehicle that is the target of the movement request using the identification information on the barrier vehicle 10A and the position information on the user terminal 200A (S103 in FIG. 9).

In S514, the center server 500 sends the alert notification to the barrier vehicle 10A (S104 in FIG. 9). In the barrier vehicle 10A, the alert is notified from the data communication device 150. However, since an occupant is not in the vehicle, a predetermined operation for the alert is not performed with no response returned from the barrier vehicle 10A to the center server 500.

In S515, since no response to the alert notification is received from the barrier vehicle 10A (S105: NO in FIG. 9), the center server 500 issues the authentication information on the vehicle 10A and sends it to the user terminal 200A which is the sending source of the movement request (S106 in FIG. 9). In S516, the specific user A, who carries the user terminal 200 holding the authentication information on the barrier vehicle 10A, moves toward the barrier vehicle 10A.

In S521, the specific user A unlocks the door of the barrier vehicle 10A using the authentication information on the barrier vehicle 10A saved in the user terminal 200A. As a result, the door of the barrier vehicle 10A is unlocked and the engine enters the start enable state. In S522, the barrier vehicle 10A sends the unlock notification to the center server 500.

In S523, the specific user A gets in the barrier vehicle 10A, starts the engine of the barrier vehicle 10A, moves the barrier vehicle 10A to another place, and parks the vehicle 10A there. In S524, the specific user A locks the door of the barrier vehicle 10A using the authentication information on the barrier vehicle 10A saved in the user terminal 200A. In S 525, the barrier vehicle 10A sends the lock notification and the position information on the barrier vehicle 10A to the center server 500. The center server 500 receives the lock notification and the position information from the barrier vehicle 10A (S107: YES in FIG. 9).

In S531, the center server 500 confirms that the barrier vehicle 10A has been moved, based on the position information received from the barrier vehicle 10A together with the lock notification and based on the position information on the barrier vehicle 10A stored in the vehicle management information table (S108: YES in FIG. 9). In S532, the center server 500 invalidates the authentication information on the barrier vehicle 10A stored in the user terminal 200A of the specific user A (S109 in FIG. 9). After the authentication information is invalidated, the specific user A cannot lock/unlock the barrier vehicle 10A.

Effect of First Embodiment

In the first embodiment, the authentication information on the barrier vehicle 10A is sent to the user terminal 200 of a specific user. This specific user is a third party who is not the user terminal's user stored in the vehicle management information table as the delivery destination of the authentication information on the vehicle 10A. That is, in the first embodiment, the authentication information on the barrier vehicle 10A is sent to a third party for temporary use without user authentication. This allows the specific user to temporarily obtain permission to lock/unlock the barrier vehicle 10A and to start the engine. For example, it becomes possible for a third party, such as emergency personnel, to unlock, and get in, the barrier vehicle 10A that obstructs the course of the specific vehicle 900, such as an emergency vehicle, and to start the engine for moving the vehicle 10A, thus minimizing a delay for the specific vehicle 900 to arrive at the destination.

In the first embodiment, when the user terminal of the sending source of the barrier vehicle movement request is the user terminal 200 of a specific user, the authentication information on the barrier vehicle 10A is sent to the user terminal 200 of the specific user. This allows the delivery destination of the authentication information on the barrier vehicle 10A to be limited to the specific user, protecting the security of the barrier vehicle 10A.

In the first embodiment, when the barrier vehicle movement request is received, the center server 500 sends the alert notification to the barrier vehicle 10A before sending the authentication information to confirm whether an occupant is in the vehicle. If an occupant is in the barrier vehicle 10A, the authentication information on the barrier vehicle 10A is not sent even to a specific user. This prevents the authentication information on the barrier vehicle 10A from being unnecessarily delivered, protecting the security of the barrier vehicle 10A.

In the first embodiment, when the lock notification is received from the barrier vehicle 10A, the center server 500 invalidates the authentication information delivered to the user terminal 200 of a specific user. This allows the authentication information, delivered to a third party other than the owner of the barrier vehicle 10A, to be used only temporarily, protecting the security of the barrier vehicle 10A. Note that when to invalidate the authentication information delivered to the user terminal 200 of a specific user is not limited to the time the lock notification is received from the barrier vehicle 10A. For example, the authentication information may be invalidated when a predetermined time elapses from the time the authentication information was sent.

In the first embodiment, when the sending source of a movement request is a specific user, the authentication information on the barrier vehicle 10A is sent to the user terminal 200 of the sending source of the movement request. Note that, however, the sending destination of the authentication information is not limited to the user terminal 200 of the sending source of the movement request. For example, when a user who is permitted by the owner of the vehicle 10A to lock/unlock the vehicle 10A is registered in advance in the center server 500 and when the sending source of a movement request is a user permitted by the owner of the vehicle 10A, the authentication information on the vehicle 10A may be sent to the user terminal of that user. A user permitted by the owner of the vehicle 10A to lock and unlock the vehicle 10A is, for example, the manager of the parking lot in which the vehicle 10A is parked. In this case, the manager of the parking lot of the vehicle 10A is an example of "the user permitted to move the first vehicle".

Second Embodiment

In a second embodiment, when a specific vehicle is started, a center server 500 detects the presence of a barrier vehicle on the traveling route of the specific vehicle. The center server 500 delivers the authentication information on the barrier vehicle to a user terminal around the detected barrier vehicle to prompt the user to move the barrier vehicle. This makes it possible to move the barrier vehicle on route of the specific vehicle more shortly and, therefore, minimizes a delay for the specific vehicle to arrive at the destination. In the description of the second embodiment, the description similar to that of the first embodiment is omitted.

Figure 11:
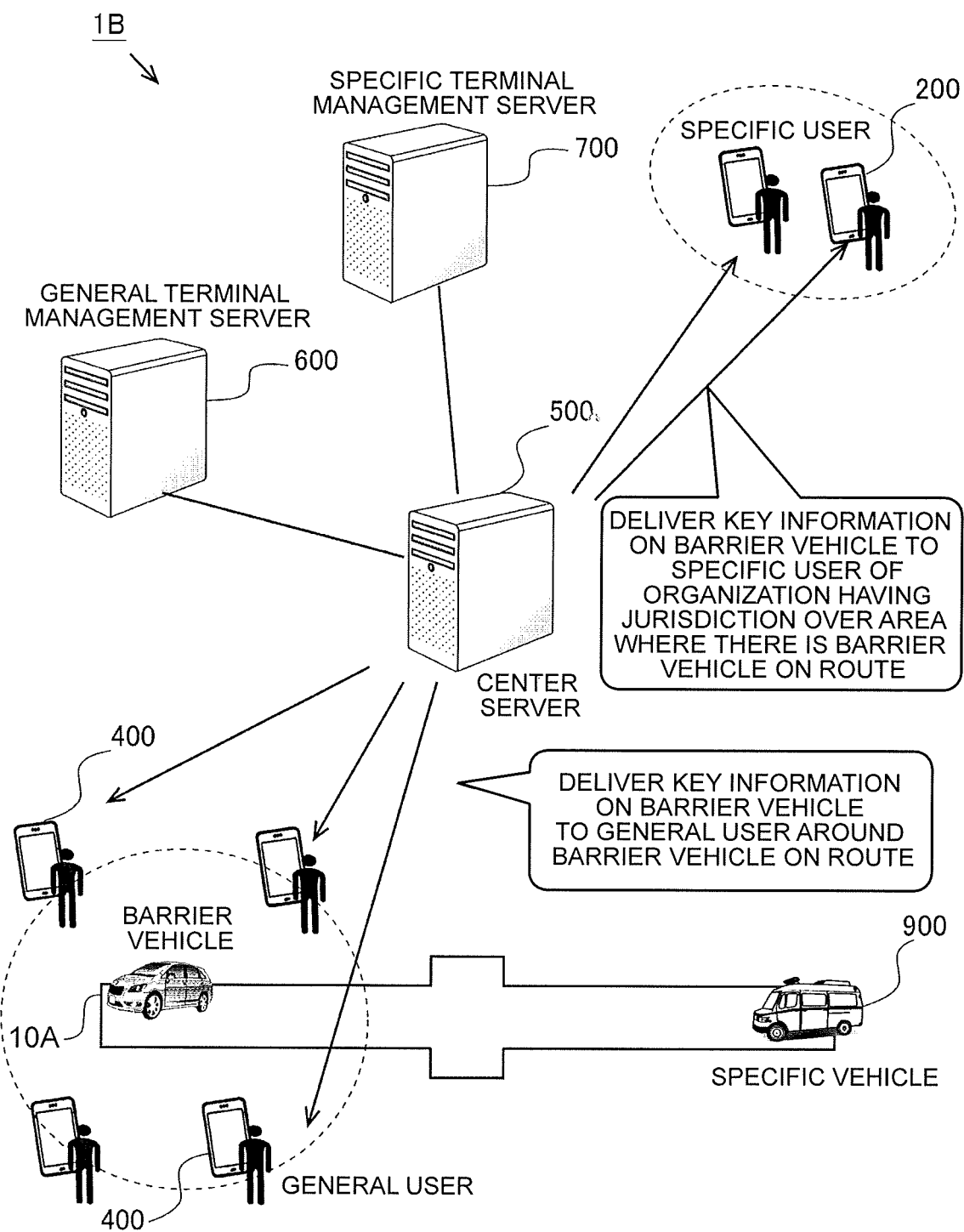
FIG. 11 is a diagram showing an example of the system configuration of a key information management system according to a second embodiment.

FIG. 11 is a diagram showing an example of the system configuration of a key information management system 1B according to the second embodiment. In addition to the user terminal 200, specific vehicle 900, barrier vehicle 10A, and center server 500, the key information management system 1B includes a user terminal 400, a general terminal management server 600, and a specific terminal management server 700.

The user terminal 400 is a user terminal owned by a general user. A general user is a user other than a specific user. The user terminal 400 is, for example, a compact computer such as a smartphone, a mobile phone terminal, a tablet terminal, a personal information terminal, and a wearable computer (smart watch, etc.). The hardware configuration of the user terminal 400 is the same as that of the user terminal 200.

The general terminal management server 600 is a server that manages the position information on the user terminals 400 of general users. The general terminal management server 600 is, for example, the server owned by a mobile network operator. The position information on the user terminals 400 managed by the general terminal management server 600 may be represented by the latitude and longitude acquired by the GPS receiver provided in the user terminals 400 or may be the information on the base station in which the information on the user terminals 400 is registered by the wireless-based position registration function of the user terminals 400.

The specific terminal management server 700 is a server that manages the position information on the user terminals 200 of specific users. The specific terminal management server 700 is, for example, the server owned by the organization to which specific users belong. The organization to which specific users belong is, for example, a fire department and a police station. The position information on the user terminal 200 of a specific user managed by the specific terminal management server 700 is represented, for example, by the latitude and longitude acquired by the GPS receiver provided in the user terminal 200. Although a plurality of general terminal management servers 600 and specific terminal management servers 700 are included in the key information management system 1B, one general terminal management server 600 and one specific terminal management server 700 are shown in FIG. 11, respectively.

In the second embodiment, the center server 500 receives the specific-vehicle start notification from one of the device provided in the specific vehicle 900 and having the communication function, the user terminal 200 of a specific user who rides in the specific vehicle 900, and the server that manages the specific vehicle 900. In addition to the specific-vehicle start notification, the information on the route to the destination of the specific vehicle 900 is also received. The specific-vehicle start notification is an example of the "first vehicle movement request".

The center server 500 detects a barrier vehicle on the route of the specific vehicle 900 from the position information on the vehicle 10A. For example, the center server 500 acquires the information on the user terminal 400 of a general user around the barrier vehicle 10A from the general terminal management server 600, and delivers the authentication information on the barrier vehicle 10A to that user terminal 400. In addition, from the specific terminal management server 700, the center server 500 acquires the information on the user terminal 200 of a specific user belonging to the organization that has jurisdiction over the area including the current position of the barrier vehicle 10A, and delivers the authentication information on the barrier terminal vehicle 10A to that user terminal 200. In addition to the authentication information on the barrier vehicle 10A, the vehicle identification information on the barrier vehicle 10A and the message prompting the user to move the barrier vehicle 10A are also sent.

The barrier vehicle 10A on the route of the specific vehicle 900 is an example of the "first vehicle". The user terminal 400 of a general user around the barrier vehicle 10A is an example of the "terminal of the second user different from the first user" and the "terminal around the first vehicle". The user terminal 200 of a specific user belonging to the organization that has jurisdiction over the area including the current position of the barrier vehicle 10A is an example of the "terminal of the second user different from the first user" and the "terminal around the first vehicle". The message prompting the movement of the barrier vehicle 10A is an example of the "signal for prompting the movement of the first vehicle". The specific vehicle 900 is an example of the "second vehicle".

The center server 500 may send the authentication information on the barrier vehicle 10A to only one of the user terminal 400 of a general user around the barrier vehicle 10A and the user terminal 200 of a specific user belonging to the organization that has jurisdiction over the area including the current position of the barrier vehicle 10A. Instead, the center server 500 may send the authentication information selectively to either one of them.

Figure 12:
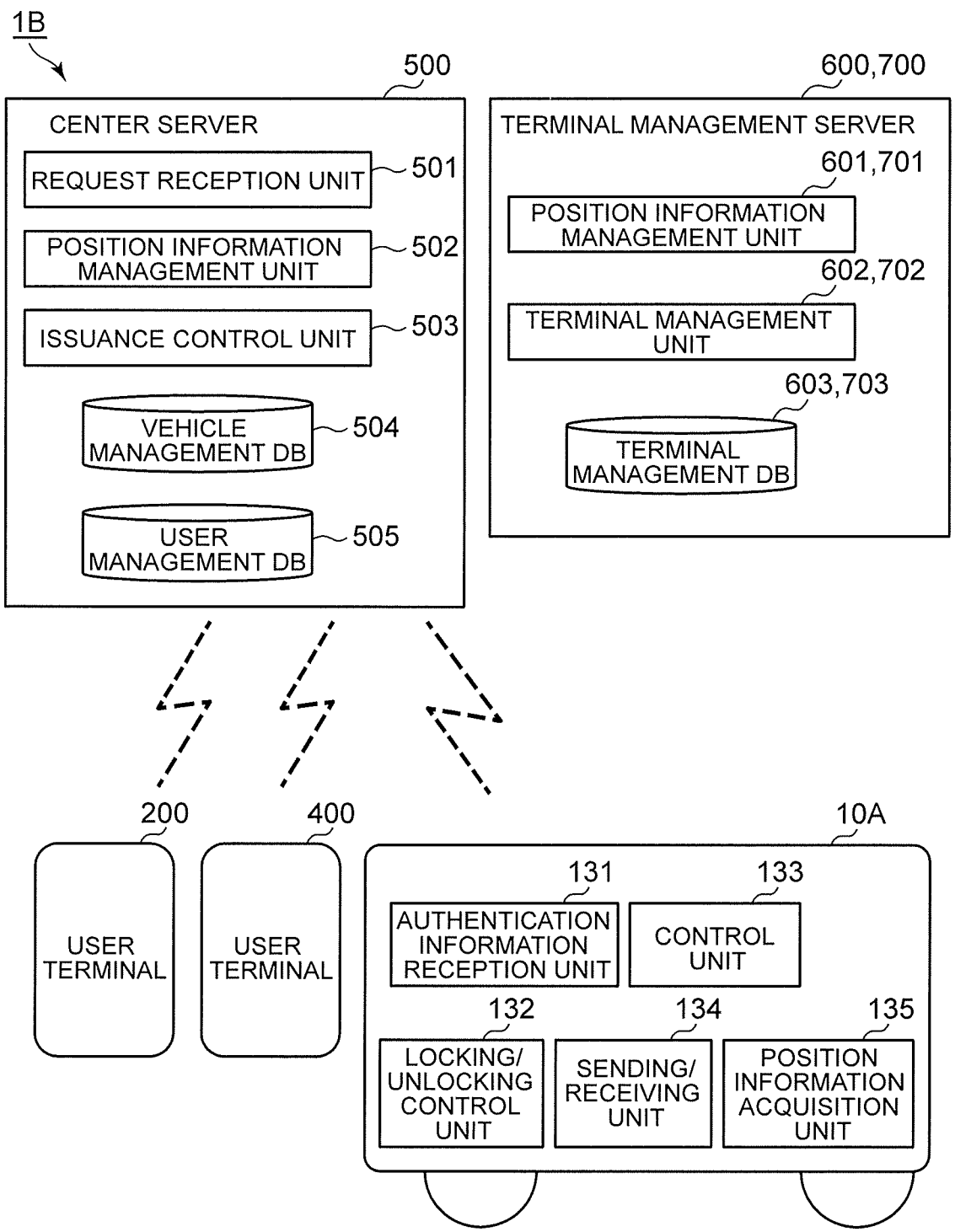
FIG. 12 is a diagram showing an example of the functional configuration of a center server, a terminal management server, and a barrier vehicle according to the second embodiment.

FIG. 12 is a diagram showing an example of the functional configuration of the center server 500, terminal management servers, and barrier vehicle 10A according to the second embodiment. In FIG. 12, the general terminal management server 600 and the specific terminal management server 700 are denoted as the terminal management server. In the description below, the general terminal management server 600 and the specific terminal management server 700 are collectively referred to as the terminal management server. The functional configuration of the center server 500 and the barrier vehicle 10A is similar to that of the center server 500 and the vehicle 10A in the first embodiment.

In the second embodiment, the request reception unit 501 of the center server 500 receives a specific-vehicle start notification and outputs the received notification to the issuance control unit 503. When the specific-vehicle start notification is received, the issuance control unit 503 identifies a barrier vehicle on the route of the specific vehicle 900 based on the route information on the specific vehicle 900 and the position information on each vehicle 10A in the system. The issuance control unit 503 asks the terminal management server about the information on the user terminal 200 and the user terminal 400 around the identified barrier vehicle 10A. The information on the user terminal 200 and the user terminal 400 acquired from the terminal management server is, for example, one of the e-mail address, telephone number, and terminal identification information on the user terminal 200 and user terminal 400 that is used for the sending destination of data. The issuance control unit 503 issues the authentication information on the barrier vehicle 10A for the user terminal 200 and the user terminal 400 around the identified barrier vehicle 10A and sends the issued authentication information to the terminal. The details of the processing of the issuance control unit 503 in the second embodiment will be described later.

The hardware configuration of the terminal management server is similar to that of the center server 500. More specifically, the terminal management server includes a CPU, a memory, an external storage device, and a communication unit. The terminal management server operates as one of the functional components illustrated in FIG. 12 when the CPU executes the corresponding computer program expanded in the memory.

The general terminal management server 600 includes a position information management unit 601, a terminal management unit 602, and a terminal management DB 603. The position information management unit 601 acquires the position information from the base station managed by the mobile network operator that owns the general terminal management server 600, or from the user terminals 400 at predetermined intervals, and registers the acquired position information in the terminal management DB 603. The terminal management unit 602 manages the user terminals 400 holding a contract with the mobile network operator that owns the general terminal management server 600. The terminal management unit 602 extracts, from the terminal management DB 603, the user terminal 400 responding to an inquiry from the center server 500 and sends the information on the extracted the user terminal 400 to the center server 500.

The terminal management DB 603 is created, for example, in the external storage device of the general terminal management server 600. The terminal management DB 603 stores the position information on the user terminals 400 holding a contract with the mobile communication network operator that owns the general terminal management server 600.

The specific terminal management server 700 also includes a position information management unit 701, a terminal management unit 702, and a terminal management DB 703. The position information management unit 701 acquires the position information from the user terminals 200 of specific users belonging to the management organization of the specific terminal management server 700 at predetermined intervals and registers the acquired position information in the terminal management DB 703. The terminal management unit 702 manages the user terminals 200 of specific users belonging to the management organization of the specific terminal management server 700. The terminal management unit 702 extracts, from the terminal management DB 703, the user terminal 200 responding to an inquiry from the center server 500, and sends the information on the extracted user terminal 200 to the center server 500.

FIG. 13 is a diagram showing an example of the terminal management information table stored in the terminal management DB 603/703 of the terminal management server. The terminal management information table has a terminal ID field and a terminal position field. The terminal ID field stores the identification number associated with the user terminal 400/200. The terminal position field stores the position information received from each user terminal 400/200. The terminal position field is updated, for example, by the position information management unit 601/701. Note that the configuration of the terminal management information table shown in FIG. 13 is merely an example, and is not limited thereto. For example, the terminal management information table may include the information on the data sending destination of the user terminal 400/200.

Figure 14:
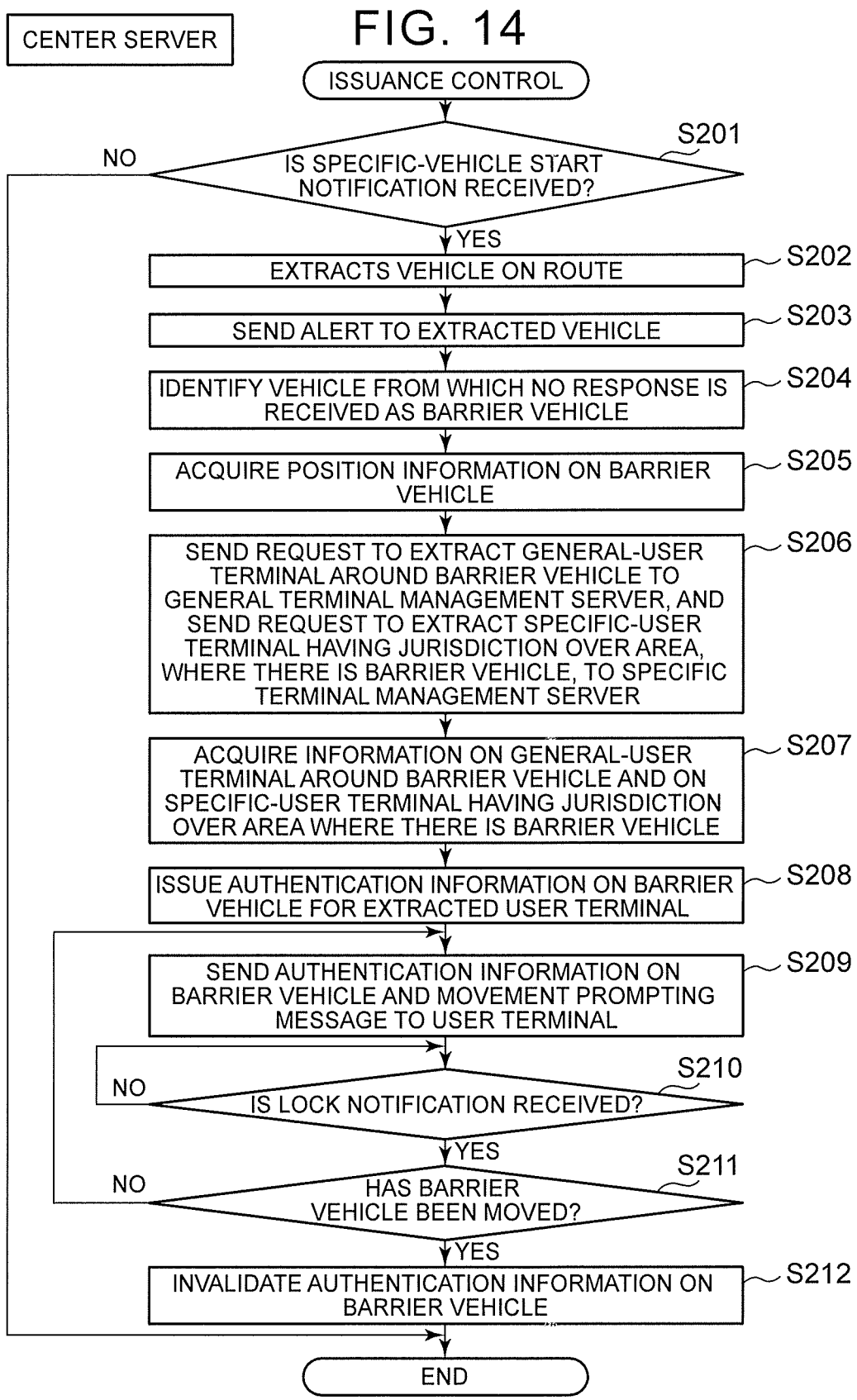
FIG. 14 is a diagram showing an example of the flowchart of the processing of an issuance control unit of the center server according to the second embodiment.

FIG. 14 is a diagram showing an example of the flowchart of the processing of the issuance control unit 503 of the center server 500 according to the second embodiment. The processing shown in FIG. 14 is executed repeatedly at predetermined intervals.

In S201, the issuance control unit 503 determines whether the specific-vehicle start notification is received. The route information on the specific vehicle 900 is also received together with the specific-vehicle start notification. If the specific-vehicle start notification is received (S201: YES), the processing proceeds to S202. If the specific-vehicle start notification is not received (S201: NO), the processing shown in FIG. 14 is terminated.

In S202, the issuance control unit 503 extracts the vehicle 10A on the route from the vehicle management information table based on the route information on the specific vehicle 900 and the position information on the vehicle 10A in the system.

In S203, the issuance control unit 503 sends an alert notification to the vehicle 10A extracted in S202. In S204, the issuance control unit 503 identifies the vehicle 10A, from which no response is received, as a barrier vehicle. For example, the vehicles 10A on the route of the specific vehicle 900 include the vehicle 10A that is moving and the vehicle 10A that is parked. Since the driver is in the vehicle 10A that is moving, the driver operates the data communication device 150 upon receiving the alert notification to return a response to the center server 500. If an occupant such as the driver is in the vehicle 10A that is parked, it is highly likely that the driver operates the data communication device 150 upon receiving the alert notification to return a response to the center server 500 and that the driver will move the vehicle 10A out of the route.

On the other hand, if an occupant such as the driver is not in the vehicle 10A that is parked, no response is returned to the alert notification and the vehicle 10A cannot move out of the route of the specific vehicle 900. In this case, the vehicle 10A is identified as a barrier vehicle. The method for identifying a barrier vehicle is not limited to the method described above. For example, the center server 500 may monitor a change in the position information on each vehicle 10A and identify the vehicle 10A as a barrier vehicle if there is little or no change in the position information.

In S205, the issuance control unit 503 acquires the position information on the barrier vehicle 10A, identified in S204, from the vehicle management information table. In S206, the issuance control unit 503 sends to the general terminal management server 600 a request to extract the user terminal 400 around the barrier vehicle 10A. Also, in S206, the issuance control unit 503 sends to the specific terminal management server 700 a request to extract the user terminal 200 of a specific user having jurisdiction over the area where there is the barrier vehicle 10A Together with a request to extract the user terminal, the position information on the barrier vehicle 10A is sent to the general terminal management server 600 or to the specific terminal management server 700.

Upon receiving the request from the center server 500, the general terminal management server 600 extracts the user terminal 400 of a general user, who is present, for example, within a predetermined range from the barrier vehicle 10A, from the terminal management information table and sends the information on the extracted user terminal 400 to the center server 500. In addition, upon receiving the request from the center server 500, the specific terminal management server 700 sends the information on the predetermined user terminal 200, which has jurisdiction over the area where there is the vehicle 10A, to the center server 500.

In S207, the issuance control unit 503 acquires the information on the user terminal 400 around the barrier vehicle 10A from the general terminal management server 600, and the information on the user terminal 200 of the specific user, having jurisdiction over the area where there is the barrier vehicle 10A, from the specific terminal management server 700. Note that the issuance control unit 503 itself may access the terminal management DB 603 of the general terminal management server 600 and extract the information on the user terminal 400 around the barrier vehicle 10A. If there is a plurality of general terminal management servers 600 or specific terminal management servers 700, the center server 500 performs the processing in S206 and S207 for each of the servers. In addition, if there is a plurality of barrier vehicles 10A, the issuance control unit 503 may perform the processing in S206 and S207 for each of the barrier vehicles 10A or may perform the processing once to acquire the information on the plurality of barrier vehicles 10A.

In S208, the issuance control unit 503 issues the authentication information on the barrier vehicle 10A for the user terminal 400 or the user terminal 200 acquired in S207. In S209, the issuance control unit 503 sends the authentication information on the barrier vehicle 10A and the message to prompt the movement of the barrier vehicle 10A to the user terminal 400 or the user terminal 200 acquired in S207.

In S210, the issuance control unit 503 determines whether the lock notification is received from the barrier vehicle 10A. If the lock notification is received (S210: YES), the processing proceeds to S211. If the lock notification is not received (S210: NO), the issuance control unit 503 enters the standby state until the lock notification is received. If the lock notification is not received from the barrier vehicle 10A after a predetermined time has elapsed, the processing may proceed to S209.

In S211, the issuance control unit 503 determines whether the barrier vehicle 10A has been moved. If the barrier vehicle 10A has been moved (S211: YES), the processing proceeds to S212. If the barrier vehicle 10A has not been moved (S211: NO), the processing proceeds to S209, and the issuance control unit 503 sends the movement prompting message again to the user terminal 400 or the user terminal 200.

In S212, the issuance control unit 503 invalidates the authentication information on the barrier vehicle 10A. After that, the processing shown in FIG. 14 is terminated. If there is a plurality of barrier vehicles 10A, the processing from S208 to S211 is performed for each of the barrier vehicles 10A.

If the center server 500 issues the authentication information on the barrier vehicle to one of the general user and the specific user, the issuance control unit 503 performs the processing shown in FIG. 14 for only one of the general user and the specific user to which the authentication information is issued.

The processing of the issuance control unit 503 shown in FIG. 14 is an example and is not limited thereto. For example, when there is no barrier vehicle on the route of the specific vehicle 900, the issuance control unit 503 does not perform the processing in S204 and the following steps. In addition, in S210, the issuance control unit 503 may determine whether the unlock notification is received instead of whether the lock notification is received.

Figure 15:
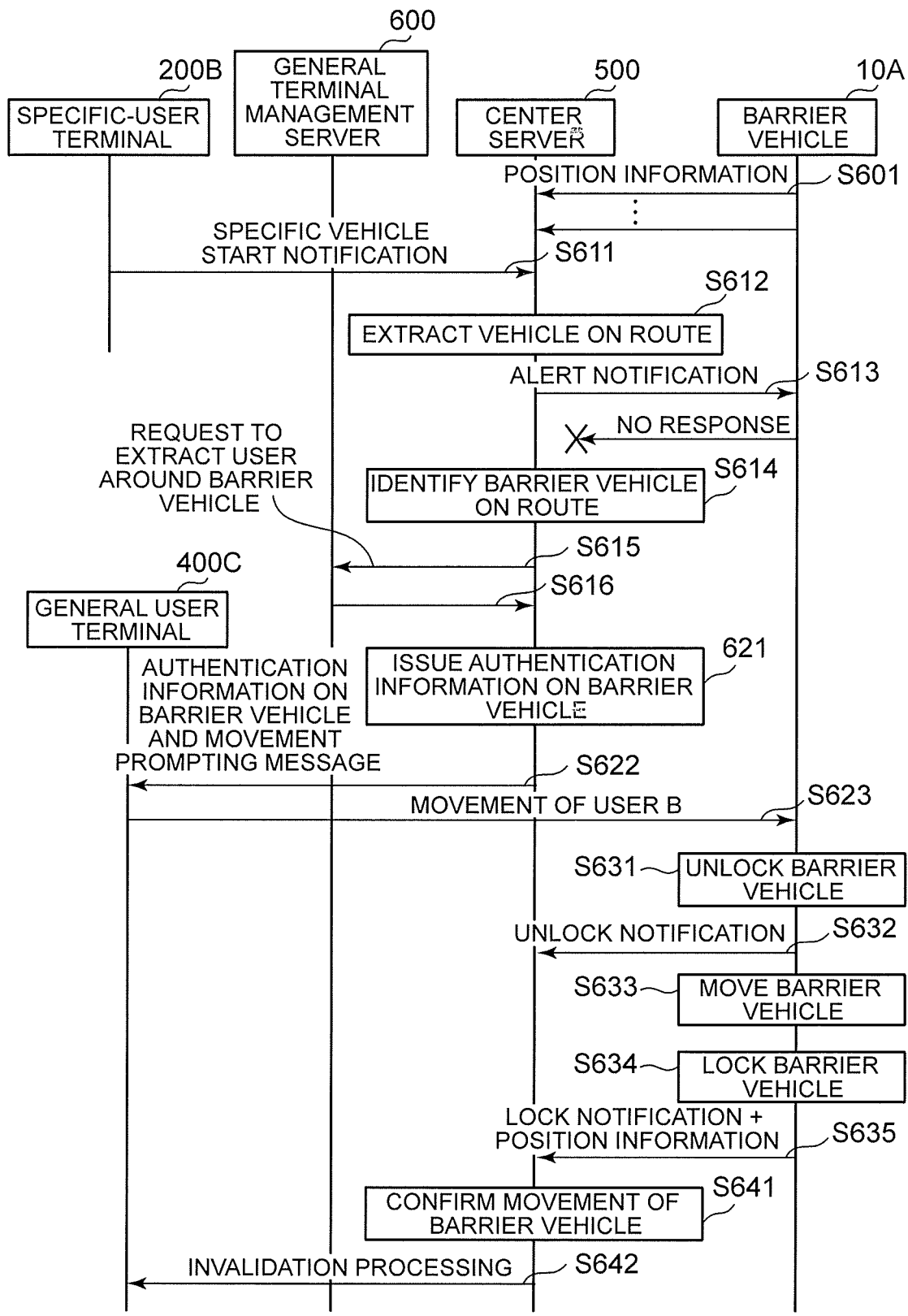
FIG. 15 is a diagram showing an example of the processing sequence in a specific example according to the second embodiment.

FIG. 15 is a diagram showing an example of the processing sequence in a specific example according to the second embodiment. In the specific example according to the second embodiment, it is assumed that the center server 500 issues the authentication information on a barrier vehicle only for a general user.

In S601, the barrier vehicle 10A sends the position information to the center server 500 at predetermined intervals. Although not shown, the position information is sent from the barrier vehicle 10A to the center server 500 at predetermined intervals also from this time on. It is assumed that the barrier vehicle 10A is a vehicle parked on the road and that a passenger such as the driver is not in the vehicle.

In S611, a specific user B who is on the specific vehicle 900 sends the specific-vehicle start notification to the center server through a user terminal 200B. The center server 500 receives the specific-vehicle start notification from the user terminal 200 B of the specific user B (S201: YES in FIG. 14). Note that the route information on the specific vehicle 900 is also sent together with the specific-vehicle start notification.

In S612, the center server 500 extracts the vehicle 10A as a vehicle that is present on the route of the specific vehicle 900 (S202 in FIG. 14). In S613, the center server 500 sends the alert notification to the extracted vehicle 10A (S203 in FIG. 14). In the barrier vehicle 10A, the alert is notified from the data communication device 150. However, since an occupant is not in the vehicle, a predetermined operation for the alert is not performed and a response is not sent from the vehicle 10A to the center server 500.

In S614, since no response to the alert notification is sent from the vehicle 10A, the center server 500 identifies the vehicle 10A as a barrier vehicle (S204 in FIG. 14). In S615, the center server 500 acquires the position information on the barrier vehicle 10A from the vehicle management information table (S205 in FIG. 14) and, then, sends a request to extract the user terminal 400 of a general user around the barrier vehicle 10A to the general terminal management server 600 (S206 in FIG. 14). In S616, the center server 500 acquires the information on the user terminal 400C of the general user C from the general terminal management server 600 (S207 in FIG. 14).

In S621, the center server 500 issues the authentication information on the barrier vehicle 10A for the user terminal 400C (S208 in FIG. 14). In S622, the center server 500 sends the authentication information on the barrier vehicle 10A, and the message to prompt the movement of the barrier vehicle 10A, to the user terminal 400C (S209 in FIG. 14).

In S623, the general user C views the message to prompt the movement of the barrier vehicle 10A displayed, for example, on the display of the user terminal 400C and moves to the barrier vehicle 10A. It is assumed that the general user C is a user carrying the driver's license.

In S631, the general user C unlocks the door of the barrier vehicle 10A using the authentication information on the barrier vehicle 10A stored in the user terminal 400C. As a result, the door of the barrier vehicle 10A is unlocked and the vehicle enters the engine start enable state. In S632, the barrier vehicle 10A sends the unlock notification to the center server 500.

In S633, the general user C gets in the barrier vehicle 10A, starts the engine of the barrier vehicle 10A, moves the barrier vehicle 10A to another place, and parks it there. In step S634, the general user C locks the door of the barrier vehicle 10A using the authentication information on the barrier vehicle 10A stored in the user terminal 400C. In S635, the barrier vehicle 10A sends the lock notification and the position information on the barrier vehicle 10A to the center server 500. The center server 500 receives the lock notification and the position information from the barrier vehicle 10A (S210: YES in FIG. 14).

In S641, the center server 500 confirms that the barrier vehicle 10A has been moved, for example, based on the position information received together with the lock notification from the barrier vehicle 10A and on the position information on the barrier vehicle 10A stored in the vehicle management information table (S211: YES in FIG. 14). In S642, the center server 500 invalidates the authentication information on the barrier vehicle 10A for the user terminal 400C of the general user C (S212 in FIG. 14).

Effect of Second Embodiment

In the second embodiment, when the specific-vehicle start notification is received, the center server 500 delivers the authentication information on the barrier vehicle 10A to the user terminal 400 of a general user around the barrier vehicle 10A that is present on the route of a specific vehicle or to the user terminal 200 of a specific user who has jurisdiction over the area where there is the barrier vehicle 10A. The general user around the barrier vehicle 10A and the specific user who has jurisdiction over the area where there is the barrier vehicle 10A is a third party different from the user of the user terminal stored in the vehicle management information table as the delivery destination of the authentication information on the vehicle 10A. That is, in the second embodiment, when the specific-vehicle start notification is received, the authentication information on the barrier vehicle 10A on the route of a specific vehicle is sent to a third-party user around the barrier vehicle 10A without user authentication. Sending the authentication information in this way temporarily allows the third party to lock and unlock, and to move, the barrier vehicle 10A. As a result, when the specific vehicle 900 passes through the route, it is highly likely that the barrier vehicle 10A has been moved out of the route of the specific vehicle 900. Therefore, the specific vehicle 900 can proceed, and arrive at the destination, smoothly since there is no vehicle 10A.

In the second embodiment, the center server 500 sends the movement prompting message, which prompts the movement of the barrier vehicle 10A, together with the authentication information on the barrier vehicle 10A. This message motivates a third party, who has received authentication information on the barrier vehicle 10A, to move the barrier vehicle 10A. Even if the user of the user terminal 400 that has received the authentication information on the barrier vehicle 10A cannot drive the vehicle, the user may temporarily lend the terminal 400, which has received the authentication information on the barrier vehicle 10A, to a nearby user who can drive the vehicle so that the nearby user can move the barrier vehicle 10A.

In the second embodiment, though the authentication information on the barrier vehicle 10A is sent to the user terminal 400 of a general user around the barrier vehicle 10A, the sending destination of the authentication information on the barrier vehicle 10A may be limited, for example, to a user who has a driver's license. The sending destination may be limited in this way by storing, for each terminal, the information about whether or not the user has a driver's license in the terminal management information table stored in the general terminal management server 600. Another embodiment is also possible in which the center server 500 performs the processing described in the first embodiment and the second embodiment.

<Recording Medium>

A program that causes a computer or another machine or apparatus (hereinafter, a computer or the like) to execute the above-described processing of the center server 500 can be recorded in a recording medium readable by a computer or the like. By causing a computer or the like to read and execute the program on this recording medium, the computer functions as the center server 500 described above.

The recording medium readable by a computer or the like refers to a non-transitory storage medium that can accumulate information, such as data and programs, by electrical, magnetic, optical, mechanical, or chemical action for later reading by a computer or the like. Among such recording media, those removable from a computer or the like include a flexible disk, a magneto-optical disk, a CD-ROM, a CD-R/W, a DVD, a Blu-ray disk, a DAT, an 8 mm tape, and memory cards such as a flash memory. There are also a hard disk, a ROM (read only memory), and the like as a recording medium fixed to a computer or the like. In addition, a Solid State Drive (SSD) may be used as a recording medium removable from a computer or the like or as a recording medium fixed to a computer or the like.

In the embodiments, the terminal of the second user may include, for example, a terminal that is the sending source of a movement request or a terminal around the first vehicle. The terminal around the first vehicle may include, for example, the terminal of a general user who is present within a predetermined range from the first vehicle and the terminal of a user who belongs to a predetermined organization having jurisdiction over the area including the current position of the first vehicle. The predetermined organizations that have jurisdiction over the area including the current position of the first vehicle may be, for example, a fire department and a police station. The users who belong to the predetermined organizations may be, for example, firefighters and policemen. The terminal of the first user to whom the key information on the first vehicle has been delivered may be, for example, the terminal of a user authenticated as a legitimate user of the first vehicle. More specifically, the terminal of the first user to whom the key information on the first vehicle has been delivered may be, for example, the terminal owned by the owner of the first vehicle, the terminal owned by a family member of the owner of the first vehicle, the terminal of an employee of the owner of the first vehicle or, when the first vehicle is a shared car, the terminal of a user who has requested to use the vehicle and has obtained permission to use the vehicle.

In the embodiments, the user permitted to move the first vehicle may be, for example, a user who is not authenticated as being a legitimate user of the first vehicle but is permitted to lock and unlock the first vehicle and to start the engine at emergency time. More specifically, the user permitted to move the first vehicle may be, for example, a user belonging to any of the above-mentioned predetermined organizations or a user permitted to move the first vehicle in advance by the owner of the first vehicle.

In the embodiments, the second vehicle may be, for example, an emergency vehicle.

The key information management device of the present disclosure may be configured as a system with one or a plurality of processing devices such as computers. When the key information management device is configured by a plurality of processing devices, the components of the key information management device are distributed among the plurality of processing devices that work together to implement the processing of the system.

What is claimed is:

1. A key information management device comprising:
    a reception unit configured to receive a movement request for moving a first vehicle, the first vehicle employing a key system in which locking and unlocking are performed by receiving key information on the first vehicle sent from at least one of a first terminal of a first user and a second terminal of a second user different from the first user;
    a storage unit configured to store the key information on the first vehicle and information on the first terminal to which the key information on the first vehicle has been delivered; and
    a control unit configured to send the key information on the first vehicle to the second terminal, wherein
    the second terminal is a terminal around the first vehicle, and
    the control unit is configured to detect the first vehicle parked on a planned route of a second vehicle different from the first vehicle.

2. The key information management device according to claim 1, wherein
    the second terminal is a terminal transmitting the movement request.

3. The key information management device according to claim 2, wherein
    the control unit is configured to send the key information on the first vehicle to the terminal transmitting the movement request when the terminal transmitting the movement request is registered in advance as a terminal carried by the second user who is permitted to move the first vehicle.

4. The key information management device according to claim 1, wherein
    the terminal around the first vehicle is a terminal present within a predetermined range from the first vehicle.

5. The key information management device according to claim 1, wherein
    the terminal around the first vehicle is a terminal of a user belonging to a predetermined organization having jurisdiction over an area including a current position of the first vehicle.

6. The key information management device according to claim 1, wherein
    the control unit is configured to send a signal for prompting a movement of the first vehicle to the second terminal, together with the key information on the first vehicle.

7. A key information management device comprising:
    a reception unit configured to receive a movement request for moving a first vehicle, the first vehicle employing a key system in which locking and unlocking are performed by receiving key information on the first vehicle sent from at least one of a first terminal of a first user and a second terminal of a second user different from the first user;
    a storage unit configured to store the key information on the first vehicle and information on the first terminal to which the key information on the first vehicle has been delivered; and
    a control unit configured to send the key information on the first vehicle to the second terminal, wherein
    the first vehicle includes a data communication device having a communication function, and
    the control unit is configured
        to send an alert notification to the data communication device, and not to send the key information on the first vehicle to any terminal when a response to the alert notification is obtained from the data communication device.

8. A key information management method comprising:

receiving, by a key information management device managing key information on a first vehicle, a movement request for moving the first vehicle employing a key system in which locking and unlocking are performed by receiving the key information on the first vehicle sent from at least one of a first terminal of a first user and a second terminal of a second user different from the first user, and the second terminal is a terminal around the first vehicle;

storing, in a storage unit, the key information on the first vehicle and information on the first terminal to which the key information on the first vehicle has been delivered;

sending the key information on the first vehicle to the second terminal; and detecting the first vehicle parked on a planned route of a second vehicle different from the first vehicle.

* * * * *